(12) United States Patent
Lee et al.

(10) Patent No.: US 7,873,837 B1
(45) Date of Patent: *Jan. 18, 2011

(54) DATA SECURITY FOR ELECTRONIC DATA FLASH CARD

(75) Inventors: Charles C. Lee, Cupertino, CA (US); I-Kang Yu, Palo Alto, CA (US); Edward W. Lee, Mountain View, CA (US); Abraham C. Ma, Fremont, CA (US); Ming-Shiang Shen, Taipei Hsien (TW)

(73) Assignee: Super Talent Electronics, Inc., San Jose, CA (US)

( * ) Notice: Subject to any disclaimer, the term of this patent is extended or adjusted under 35 U.S.C. 154(b) by 981 days.

This patent is subject to a terminal disclaimer.

(21) Appl. No.: 11/685,143

(22) Filed: Mar. 12, 2007

Related U.S. Application Data

(63) Continuation-in-part of application No. 09/478,720, filed on Jan. 6, 2000, now Pat. No. 7,257,714, and a continuation-in-part of application No. 11/377,235, filed on Mar. 15, 2006, now Pat. No. 7,631,195.

(51) Int. Cl.
*G06F 21/00* (2006.01)
*H04L 9/00* (2006.01)
*H04K 1/00* (2006.01)

(52) U.S. Cl. .................................. 713/189; 713/179
(58) Field of Classification Search .................. None
See application file for complete search history.

(56) References Cited

U.S. PATENT DOCUMENTS

| | | | |
|---|---|---|---|
| 4,558,176 A | 12/1985 | Arnold et al. | |
| 4,582,985 A | 4/1986 | Lofberg | |
| 4,630,201 A | 12/1986 | White | |
| 4,766,293 A | 8/1988 | Boston | |
| 4,926,480 A | 5/1990 | Chaum | |
| 5,020,105 A | 5/1991 | Rosen et al. | |
| 5,180,901 A | 1/1993 | Hiramatsu | |
| 5,280,527 A | 1/1994 | Gullman et al. | |
| 5,502,797 A | 3/1996 | Bush et al. | |
| 5,596,738 A | 1/1997 | Pope | |

(Continued)

FOREIGN PATENT DOCUMENTS

JP 63-163589 A 7/1988

(Continued)

*Primary Examiner*—Christopher A Revak
(74) *Attorney, Agent, or Firm*—Bever, Hoffman & Harms, LLP; Patrick T. Bever

(57) ABSTRACT

An electronic data flash card includes a random number generator that generates a random number stored in the card and a host system each time the card is accessed by the host system. The random number is used by the host system to encrypt a logical branch address, a user password, and user data that is written to and stored in a secure area of the card. The random number is encrypted using a key associated with the card, and the encrypted random number is stored by the card with the associated encrypted data. The random number is not stored in the host system. A new random number is generated each time the card is queried. In a read process the host system decrypts the encrypted random number using the key, then uses the random number to decrypt the associated encrypted data. Access to read/write processes are password protected.

20 Claims, 15 Drawing Sheets

U.S. PATENT DOCUMENTS

| | | | |
|---|---|---|---|
| 5,623,552 A | 4/1997 | Lane | |
| 5,959,541 A | 9/1999 | DiMaria et al. | |
| 6,012,636 A | 1/2000 | Smith | |
| 6,067,621 A | 5/2000 | Yu et al. | |
| 6,069,920 A | 5/2000 | Schulz et al. | |
| 6,069,970 A | 5/2000 | Salatino et al. | |
| 6,125,192 A | 9/2000 | Bjorn et al. | |
| 6,193,152 B1 | 2/2001 | Fernando et al. | |
| 6,272,628 B1 | 8/2001 | Aguilar et al. | |
| 6,321,478 B1 | 11/2001 | Klebes | |
| 6,354,858 B1 | 3/2002 | Cooper et al. | |
| 6,550,011 B1 | 4/2003 | Sims, III | |
| 6,823,435 B1 | 11/2004 | Wisor | |
| 7,325,132 B2* | 1/2008 | Takayama et al. | 713/168 |
| 7,478,248 B2* | 1/2009 | Ziv et al. | 713/193 |
| 7,522,726 B2* | 4/2009 | Ishiguro et al. | 380/46 |
| 2001/0043174 A1 | 11/2001 | Jacobsen et al. | |
| 2004/0103288 A1 | 5/2004 | Ziv et al. | |
| 2004/0139028 A1 | 7/2004 | Fishman et al. | |
| 2004/0139290 A1 | 7/2004 | Wolrich et al. | |
| 2004/0195339 A1 | 10/2004 | Chen et al. | |
| 2004/0236936 A1 | 11/2004 | Bulusu et al. | |
| 2005/0060528 A1 | 3/2005 | Kim | |
| 2005/0283598 A1 | 12/2005 | Gaskins et al. | |
| 2006/0129797 A1 | 6/2006 | Durfee et al. | |
| 2007/0198856 A1* | 8/2007 | Lee et al. | 713/190 |
| 2007/0198861 A1 | 8/2007 | Minami et al. | |
| 2007/0234421 A1 | 10/2007 | Ogino et al. | |
| 2009/0100265 A1* | 4/2009 | Tadokoro | 713/172 |
| 2010/0031061 A1* | 2/2010 | Watanabe et al. | 713/193 |
| 2010/0043078 A1* | 2/2010 | Estakhri et al. | 726/27 |

FOREIGN PATENT DOCUMENTS

| | | |
|---|---|---|
| JP | 02-118790 A | 5/1990 |
| JP | 11-039483 | 2/1999 |

* cited by examiner

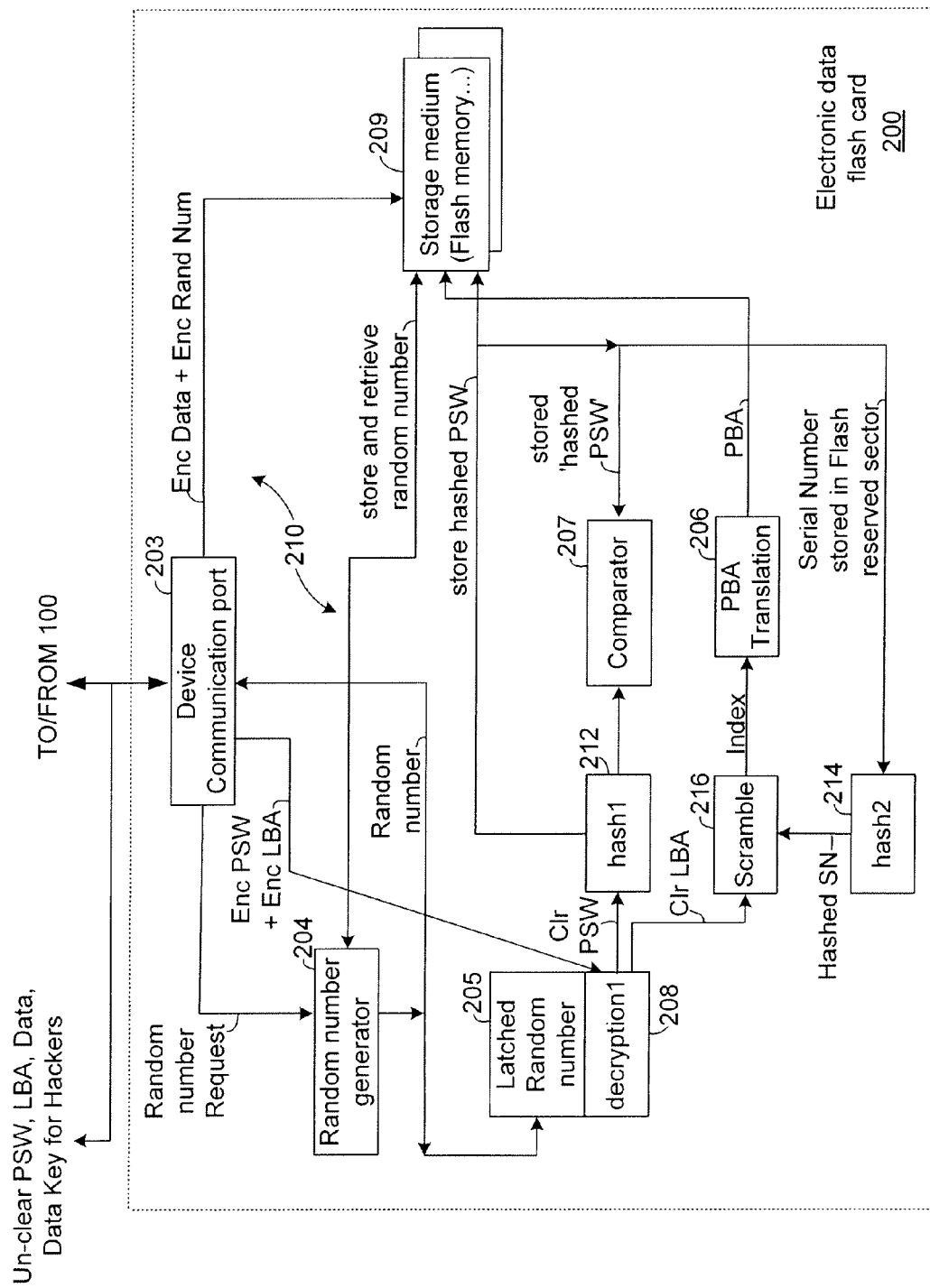
FIG. 2(B)  Security Portable Storage System Block Diagram

1st time PSW entry

PSW change

Public and Security address transform

Prior Art FAT structure

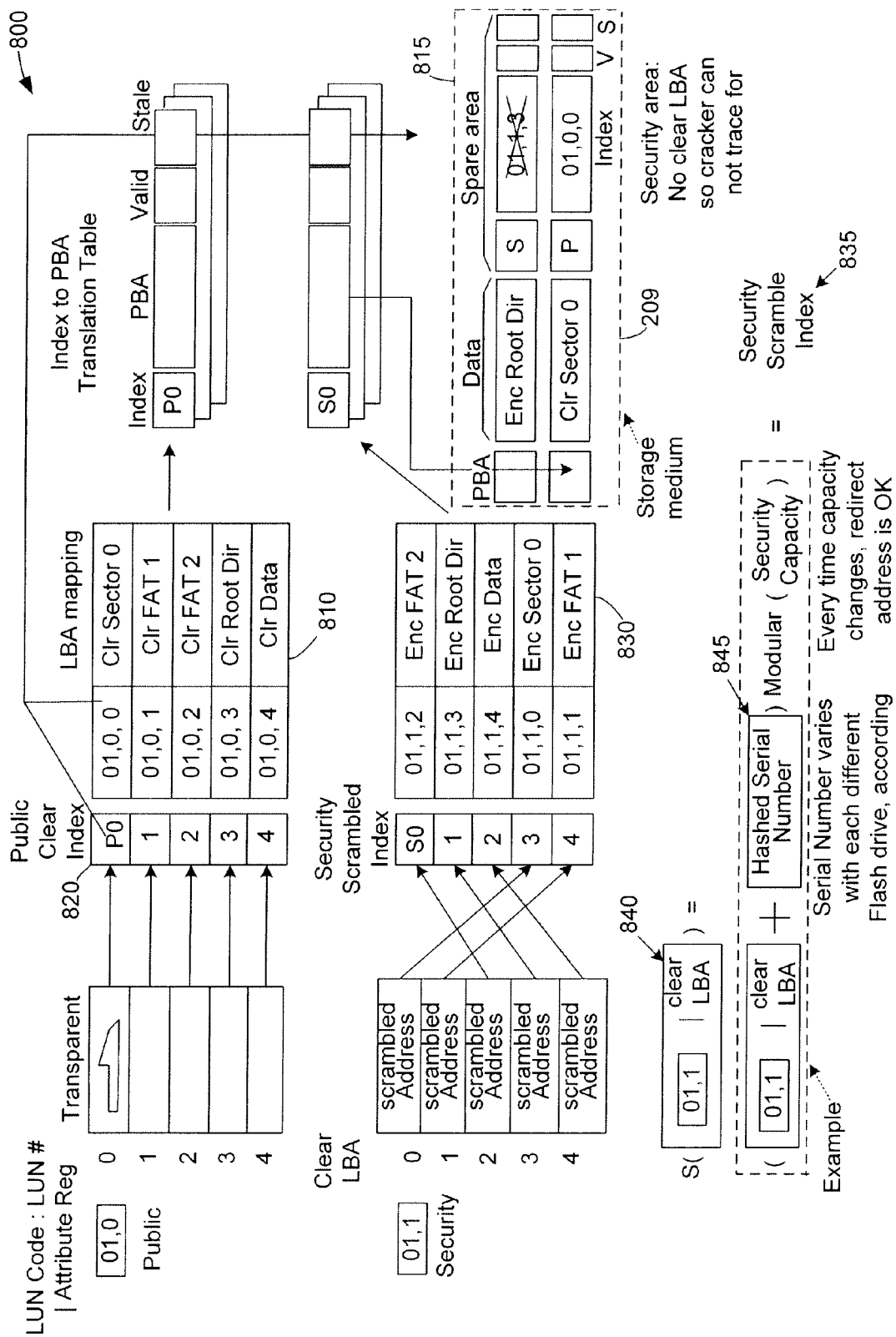
Fig. 8 Address transform

Hacker Prevention Method

DATA SECURITY FOR ELECTRONIC DATA FLASH CARD

RELATED APPLICATIONS

This application is a continuation-in-part (CIP) of U.S. Patent application for "ELECTRONIC DATA STORAGE MEDIUM WITH FINGERPRINT VERIFICATION CAPABILITY", U.S. application Ser. No. 09/478,720, filed Jan. 6, 2000, now U.S. Pat. No. 7,257,714, and a CIP of "System and Method for Providing Security to a Portable Storage Device", U.S. application Ser. No. 11/377,235, filed on Mar. 15, 2006, now U.S. Pat. No. 7,631,195. This application is also related to "Integrated circuit card with fingerprint verification capability" application Ser. No. 09/366,976, filed on Aug. 4, 1999, now U.S. Pat. No. 6,547,130, all of which are incorporated herein as though set forth in full.

FIELD OF THE INVENTION

The present invention relates to an electronic data flash card, and more particularly to multiple function flash memory systems for electronic data flash cards.

BACKGROUND OF THE INVENTION

Confidential data files are often stored in floppy disks or are delivered via networks that require passwords or that use encryption coding for security. Confidential documents are sent by adding safety seals and impressions during delivery. However, confidential data files and documents are exposed to the danger that the passwords, encryption codes, safety seals and impressions may be broken (deciphered), thereby resulting in unauthorized access to the confidential information.

As flash memory technology becomes more advanced, flash memory is replacing traditional magnetic disks as storage media for mobile systems. Flash memory has significant advantages over floppy disks or magnetic hard disks such as having high-G resistance and low power dissipation. Because of the smaller physical size of flash memory, they are also more conducive to mobile systems. Accordingly, the flash memory trend has been growing because of its compatibility with portable (mobile) systems and low-power feature.

Universal Serial Bus (USE) electronic data flash cards (referred to herein as USB devices) are portable, low power devices that utilize USB technology to interface between a host computer and a flash memory device of the flash card. USB devices take many forms, such as pen drive storage devices, MP3 players, and digital cameras. In each instance, the USB device typically includes one or more flash memory "chips", a processor, and USE interface circuitry. USB flash memory devices are popular devices used for data storage. While conventional USB flash memory devices are limited to data storage, they are popular because they are portable, easily erasable, and easily formatted.

A potential problem with electronic data flash cards, such as USB flash devices, is that confidential data stored in the flash memory can be accessed by unauthorized thieves and/or "hackers". That is, unencrypted data stored on a USE flash memory device may be misappropriated by someone that steals the USB flash memory device and accesses the stored data using either an authorized or unauthorized host system. Alternatively, clever "hackers" may gain unauthorized access to the data by monitoring bus transmissions between the USB flash memory device and a host system.

Accordingly, what is needed is an improved flash memory system in which confidential data is transmitted between and host system and the flash memory system and is stored on the flash memory system in secure manner. The system should be flexible, secure, simple, cost effective, and capable of being easily adapted to existing technology. The present invention addresses such a need.

SUMMARY OF THE INVENTION

The present invention is generally directed to an electronic data flash card including a flash memory device, an optional fingerprint sensor, an input-output interface circuit and a processing unit. The electronic data flash card is adapted to be accessed by a host (external) computer such as a personal computer, notebook computer or other electronic host device. As an electronic data flash card is easier to carry and durable for ruggedness, personal data can be stored inside the flash memory device in an encrypted form such that it can only be accessed, for example, by way of the optional fingerprint sensor or a user password to make sure unauthorized persons cannot misuse the card.

The present invention provides, in a preferred embodiment, for a system and method for providing security to an electronic data flash card in which the electronic data flash card includes a random number generator operable to generate a random number each time the electronic data flash card is queried by an authorized host system. The random number generated in this manner is used by the host system in a write process to encrypt a logical block address (LBA), a user password, and user data. The encrypted LBA, password and data are then transmitted to the electronic data flash card and stored in a secure area of the electronic data flash card. The write process further includes encrypting the random number using a predetermined key associated with the target electronic data flash card (e.g., a value based on a serial number of the electronic data flash card), and transmitting the encrypted random number from the host system to the electronic data flash card for storage in association with the encrypted data. The random number is not stored in the host system. In one embodiment, a new random number is generated each time the electronic data flash card is queried (i.e., accessed by the host system).

In accordance with another aspect of the present invention, during a secure data read operation, the host system reads the host system reads both the desired encrypted data and the encrypted random number associated with the desired data from the electronic data flash card. The host system then decrypts the encrypted random number using the predetermined key associated with the electronic data flash card to generate the random number. The host system then uses the random number to decrypt the desired encrypted data.

In accordance with another aspect of the present invention, access to read/write processes are password protected, or protected using a user identification device such as a fingerprint sensor.

BRIEF DESCRIPTION OF THE DRAWINGS

These and other features, aspects and advantages of the present invention will become better understood with regard to the following description, appended claims, and accompanying drawings, where:

FIGS. 2(A) and 2(B) are block diagrams showing a flash memory system for secure data transmission and storage in accordance with an embodiment of the present invention.

FIG. 8 is a schematic representation of an address transform in accordance with the present invention.

FIG. 9, which includes

DETAILED DESCRIPTION OF THE DRAWINGS

The present invention relates to an improvement in methods for producing electronic data flash cards. Although the present invention is described below with specific reference to USB electronic data flash cards, the present novel aspects of the present invention can be used in the manufacture of a wide range of flash card types, including but not limited to PCI Express, Secure Digital (SD), Memory Stick (MS), Compact Flash (CF), IDE and SATA flash memory cards.

Figure 1A:
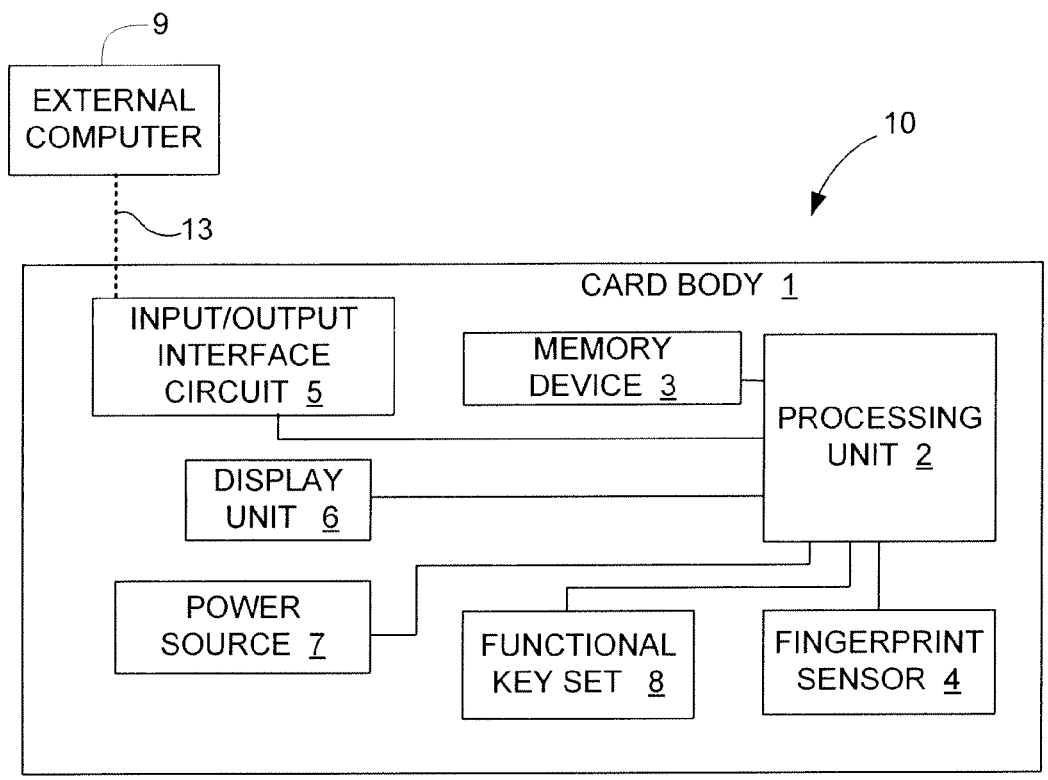
FIG. 1(A) is a block diagram showing an electronic data flash card and host system according to an embodiment of the present invention.

Referring to FIG. 1(A), according to an embodiment of the present invention, an electronic data flash card 10 is adapted to be accessed by an external computer (host system) 9 either via an interface bus 13 or a card reader (not shown) or other interface mechanism (not shown), and includes a card body 1, a processing unit 2, one or more flash memory devices 3, an optional fingerprint sensor (security device) 4, an input/output interface circuit 5, an optional display unit 6, an optional power source (e.g., battery) 7, and an optional function key set 8.

Flash memory device 3 is mounted on the card body 1, and stores in a known manner therein a data file, a reference password, and fingerprint reference data obtained by scanning a fingerprint of a person authorized to access the data file. The data file can be a picture file or a text file. As set forth below, the flash memory device 3 also includes boot code data and control code data.

The fingerprint sensor 4 is mounted on the card body 1, and is adapted to scan a fingerprint of a user of electronic data flash card 10 to generate fingerprint scan data. One example of the fingerprint sensor 4 that can be used in the present invention is that disclosed in a co-owned U.S. Pat. No. 6,547,130, entitled "INTEGRATED CIRCUIT CARD WITH FINGERPRINT VERIFICATION CAPABILITY", the entire disclosure of which is incorporated herein by reference. The fingerprint sensor described in the above patent includes an array of scan cells that defines a fingerprint scanning area. The fingerprint scan data includes a plurality of scan line data obtained by scanning corresponding lines of array of scan cells. The lines of array of scan cells are scanned in a row direction as well as column direction of said array. Each of the scan cells generates a first logic signal upon detection of a ridge in the fingerprint of the holder of card body, and a second logic signal upon detection of a valley in the fingerprint of the holder of card body.

The input/output interface circuit 5 is mounted on the card body 1, and can be activated so as to establish communication with the host computer 9 by way of an appropriate socket via an interface bus 13 or a card reader. In one embodiment, input/output interface circuit 5 includes circuits and control logic associated with one of a Universal Serial Bus (USB), PCMCIA and RS232 interface structure that is connectable to an associated socket connected to or mounted on the host computer 9. In another embodiment, the input/output interface circuit 5 may include one of a Secure Digital (SD) interface circuit, a Multi-Media Card (MMC) interface circuit, a Compact Flash (CF) interface circuit, a Memory Stick (MS) interface circuit, a PCI-Express interface circuit, a Integrated Drive Electronics (IDE) interface circuit, and a Serial Advanced Technology Attachment (SATA) interface circuit, which interface with the host computer 9 via an interface bus 13 or a card reader.

The processing unit 2 is mounted on the card body 1, and is connected to the memory device 3, the fingerprint sensor 4 and the input/output interface circuit 5 by way of associated conductive traces or wires disposed on card body 1. In one embodiment, processing unit 2 is one of an 8051, 8052, 80286 microprocessor available, for example, from Intel Corporation. In other embodiments, processing unit 2 includes a RISC, ARM, MIPS or other digital signal processor. In accordance with an aspect of the present invention, processing unit 2 is controlled by a program stored at least partially in flash memory device 3 such that processing unit 2 is operable selectively in: (1) a programming mode, where the processing unit 2 activates the input/output interface circuit 5 to receive the data file, the boot code data, the control code data, and optional fingerprint reference data from the host computer 9, and to store the data in the flash memory device 3 (as an option, in a compressed format to increase storage capacity of the memory device 3); (2) a reset mode in which the boot code data and the control code data are read from the flash memory device and utilized to configure and control the operation of the processing unit 2; (3) a data retrieving mode, where the processing unit 2 reads the fingerprint scan data from the fingerprint sensor 4, compares the fingerprint scan data with at least a segment of the fingerprint reference data in the flash memory device 3 to verify if the user of the electronic data flash card 10 is authorized to access the data file stored in the flash memory device 3, and activates the input/output interface circuit 5 to transmit the data file to the host computer 9 upon verifying that the user is authorized to access the data file stored in the flash memory device 3; (4) a code updating mode in which the boot code data and the control code data are updated in the memory device 3; and (5) a data resetting mode, where the data file and the fingerprint reference data are erased from the memory device 3. In operation, host computer 9 sends write (program) and read (data retrieval) requests to electronic data flash card 10 via a card reader or interface bus 13 and input/output interface circuit 5 to the processing unit 2, which in turn utilizes a flash memory controller (not shown) to read from or write to the associated one or more flash memory device 3. In one embodiment, the processing unit 2 automatically initiates the data resetting mode operation upon detecting that a preset time period has elapsed since storage of the data file and the fingerprint reference data in the memory device 3.

8051, 8052 and 80286 are microprocessors developed by Intel Corporation, using complex instruction set. 8051 and 8052 microprocessors have an 8-bit data bus, whereas 80286 processors have a 16-bit data bus. RISC, ARM and MIPS are microprocessors using the architecture of reduced instruction set. 8051 and 8052 are widely used in low cost application. 80286 can be used for higher speed/performance applications. RISC, ARM and MIPS are higher cost microprocessors better suited to more complex applications such as advanced ECC (Error Correction Code) and data encryption.

The optional power source 7 is mounted on the card body 1, and is connected to the processing unit 2 and other associated units on card body 1 for supplying needed electrical power thereto.

The optional function key set 8, which is mounted on the card body 1, is connected to the processing unit 2, and is operable so as to initiate operation of processing unit 2 in a selected one of the programming, reset, data retrieving, code updating, and data resetting modes. The function key set 8 is operable to provide an input password to the processing unit 2. The processing unit 2 compares the input password with the reference password stored in the flash memory device 3, and initiates authorized operation of electronic data flash card 10 upon verifying that the input password corresponds with the reference password.

The optional display unit 6 is mounted on the card body 1, and is connected to and controlled by the processing unit 2 for showing the data file exchanged with the host computer 9 and for displaying the operating status of the electronic data flash card 10.

The following are some of the advantages of the present invention: first, the electronic data flash card has a small volume but a large storage capability, thereby resulting in convenience during data transfer; and second, because everyone has a unique fingerprint, the electronic data flash card only permits authorized persons to access the data files stored therein, thereby resulting in enhanced security.

Additional features and advantages of the present invention are set forth below.

Figure 1B:
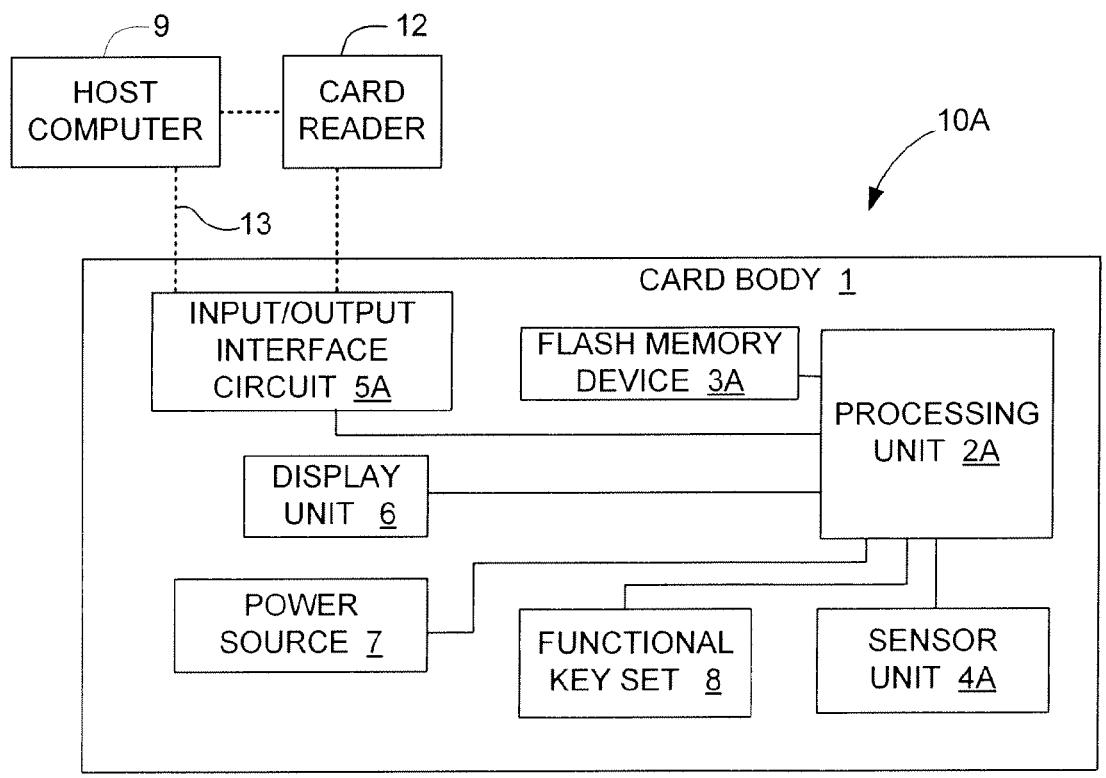
FIG. 1(B) is a block diagram showing an electronic data flash card and host system according to another embodiment of the present invention.

FIG. 1(B) is a block diagram of an electronic data flash card 10A in accordance with an alternative embodiment of the present invention in which a generalized sensor unit 4A is provided in place of the fingerprint sensor described above. Exemplary sensor units include retina (eye) scanners or voice recognition devices that are capable of detecting a physical characteristic of an authorized user, and operates in a manner similar to that described above with reference to fingerprint sensor 4.

Figure 1C:
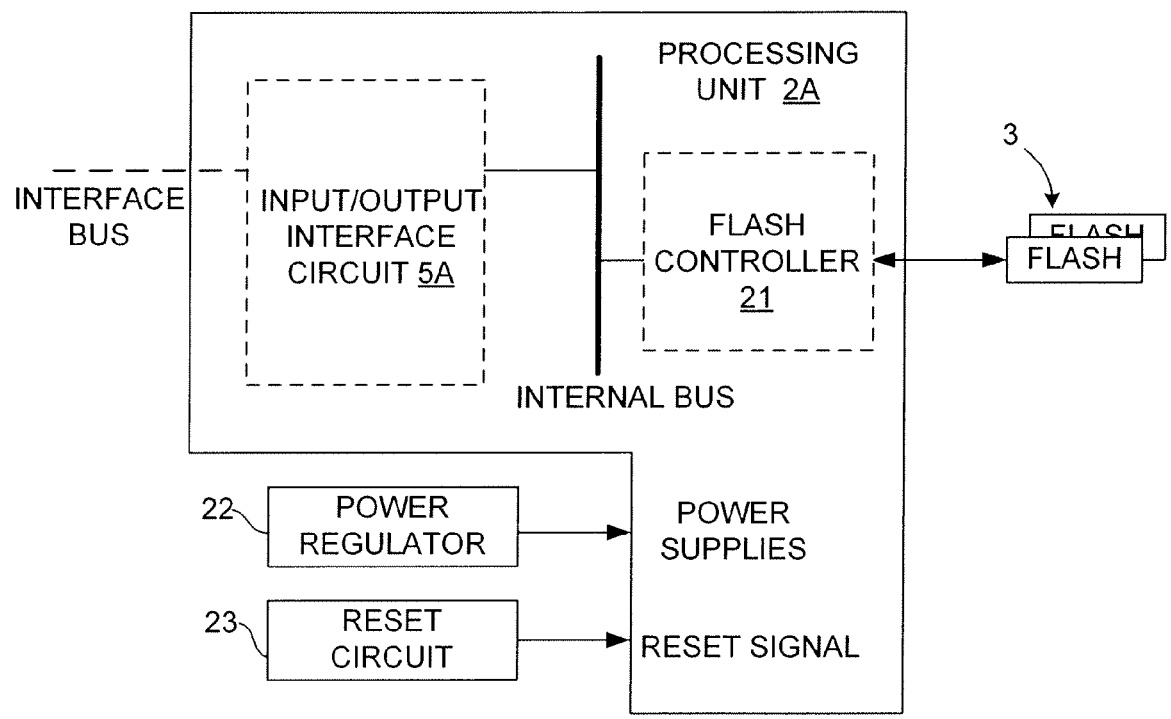
FIG. 1(C) is a block diagram showing the electronic data flash card of FIG. 1(B) in additional detail.

FIG. 1(C) shows processing unit 2A of FIG. 1(B) in additional detail. Electronic data flash card 10A includes a power regulator 22 for providing one or more power supplies. The power supplies provide different voltages to processing unit 2A and other associated units of electronic data flash card 10A according to the power requirements. Capacitors (not shown) may be required for power stability. Electronic data flash card 10A includes a reset circuit 23 for providing a reset signal to processing unit 2A. Upon power up, reset circuit 23 asserts reset signal to all units. After internal voltages reach a stable level, the reset signal is then de-asserted, and resisters and capacitors (not shown) are provided for adequate reset timing adjustment. Electronic data flash card 10A also includes a quartz crystal oscillator (not shown) to provide the fundamental frequency to a PLL within processing unit 2A. In accordance with an embodiment of the present invention, input/output interface circuit 5A, reset circuit 23, and power regulator 22 are integrated or partially integrated within processing unit 2A. The high integration substantially reduces the overall space needed, the complexity, and the cost of manufacturing. Compactness and reduced cost are key factors to removable devices such as the electronic data flash cards described herein. Modern IC (Integrated Circuits) packaging can integrate discrete IC components with different technology and material into one IC package. For example, the input/output interface circuit is analog and digital mixed circuitry, which can be integrated into one MCP (Multi-Chip Package) with the processing unit. The reset circuit and power regulator are analog circuitry, which can also be integrated into the MCP with the processing unit. The nature of mixed signal IC technology allows the hybrid integration of both analog and digital circuitry. Therefore, higher integration can be incorporated into the same chip/die for the processing unit which includes input/output interface circuit, flash memory controller, reset circuit and power regulator.

Figure 1D:
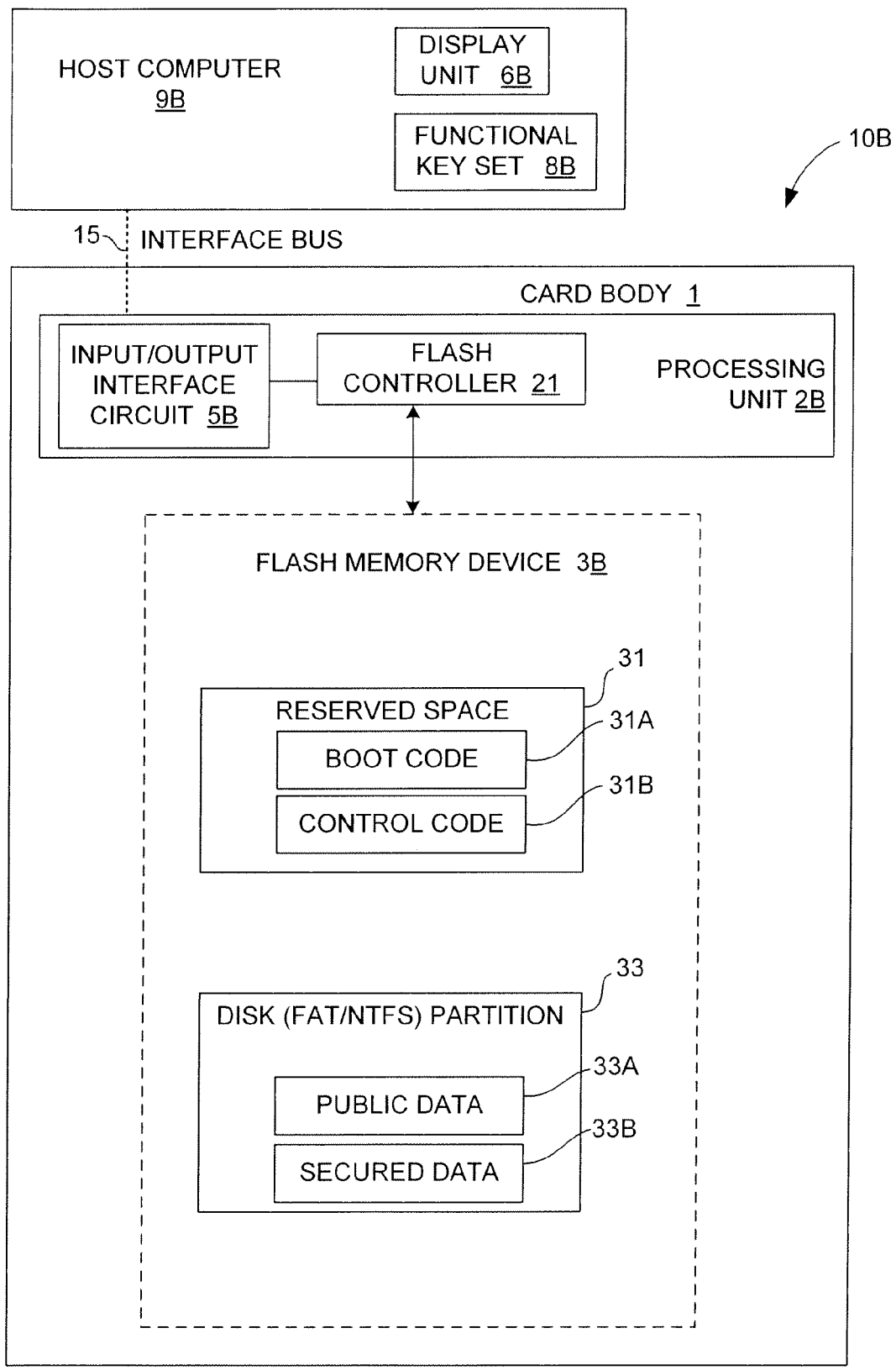
FIG. 1(D) is a block diagram of a processing unit utilized in an electronic data flash card in accordance with another embodiment of the present invention.

FIG. 1(D) is a block diagram of an electronic data flash card 10B in accordance with another embodiment of the present invention. Electronic data flash card 10B omits the fingerprint sensor and the associated user identification process. The electronic data flash card 10B also includes a highly integrated processing unit 2B including an input/output interface circuit 5B and a flash memory controller 21 for integration cost reduction reasons. Input/output interface circuit 5B includes a transceiver block, a serial interface engine block, data buffers, registers and interrupt logic. Input/output interface circuit 5B is coupled to an internal bus to allow for the various elements of input/output interface circuit 5B to communicate with the elements of flash memory controller 21. Flash memory controller 21 includes a microprocessor unit, a ROM, a RAM, flash memory controller logic, error correction code logic, and general purpose input/output (GPIO) logic. In one embodiment, the GPIO logic is coupled to a plurality of LEDs for status indication such as power good, read/write flash activity, etc., and other I/O devices. Flash memory controller 21 is coupled to one or more flash memory devices 38.

Host computer 9B, which can either be a manufacture/test system or a user system, includes a function key set 8B, is connected to the processing unit 2B via an interface bus 15 when electronic data flash card 10B is in operation. When host computer 9B is a manufacture/test system, function key set 8B is used to selectively set electronic data flash card 10B in one of a formatting/testing mode and a code updating mode. When host computer 92 is a manufacture/test system, function key set 88 is used to selectively set electronic data flash card 10B in one of a data writing (programming) mode, a data retrieving mode, and data reset mode. The function key set 8B is also operable to provide an input password to the host computer 9B that facilitates either authorization to enter either the formatting/testing or code updating modes (i.e., entering a manufacturer-defined password), or authorization to access secure data (i.e., entering a user-defined password). The processing unit 2B compares the input password with the reference password stored in the flash memory device 3B, and initiates authorized operation of electronic data flash card 10B upon verifying that the input password corresponds with the reference password.

Host computer 9B includes display unit 6B, is connected to the processing unit 2B when is in operation via an interface bus or a card reader. Display unit 6B is used for showing the data file exchanged with the host computer 9B, and for showing the operating status of the electronic data flash card 10B. In addition, as explained in additional detail below, display unit 6B may be selectively controlled by electronic data flash card 10B to automatically display an advertisement or other message when electronic data flash card 10B is manually connected to host computer 9B.

In accordance with an embodiment of the present invention, processing unit 2B includes a flash memory type algorithm for detection if a flash memory type is supported by the flash memory controller logic. Flash memory controllers with such intelligent algorithms are disclosed, for example, in U.S. patent application Ser. No. 11/466,759, entitled FLASH MEMORY CONTROLLER FOR ELECTRONIC DATA FLASH CARD, now U.S. Pat. No. 7,702,831, which is incorporated herein by reference in its entirety.

The system architecture of a typical flash memory system includes flash memory controller having processor, ROM and RAM, in which the boot code and control code are residing in the ROM as ROM code. Upon power up, the processor fetches the boot code for execution, the boot code initializes the system components and loads the control code into RAM. Once the control code is loaded into the RAM, it takes control of the system. The control code includes drivers to perform basic tasks such as controlling and allocating memory, prioritizing the processing of instructions, controlling input and output ports etc. The control code also includes the flash type detection algorithm and the flash memory parameters data. The ROM is a read only memory, after the flash memory controller design is done and moved into production, the software code in ROM is frozen and cannot be changed to support new flash types released to the market in the later time. In such a situation, a new flash memory controller has to be developed to support new flash memories from time to time, which is costly and time consuming.

In accordance with another embodiment of the present invention, flash memory device 3B includes a reserved space 31 (i.e., a predetermined block of flash memory cells) that is used to store dynamic boot code 31A and control code 31B. At start-up, flash controller 21 utilizes static boot code stored in the controller's ROM to selectively read dynamic boot code 31A and control code 31B into main memory, and then flash controller 21 proceeds with boot and control operations in accordance with dynamic boot code 31A and control code 31B. By storing at least a portion of the boot code and control code used by flash controller 21 in reserved space 31, instead of in the flash memory controller ROM, the boot code and control code can be updated in the field without having to change the flash memory controller, and the size of the controller's ROM can be minimized. A flash card including boot code and control code stored in flash memory is disclosed, for example, in co-pending U.S. patent application Ser. No. 11/611,811, entitled FLASH MEMORY CONTROLLER FOR ELECTRONIC DATA FLASH CARD, filed Dec. 13, 2006, which is incorporated herein by reference in its entirety.

Also in accordance with the present invention, the flash memory cells of flash memory device 3B are partitioned using known formatting techniques to include at least one disk partition 33 that is formatted using a typical data storage file system (e.g., 16-bit File Allocation Table (FAT16) file system, 32-bit File Allocation Table (FAT32) file system, or New Technology (NT) File System (NTFS)). Disk partition 33 includes data that is either public data 33A that is accessible without a user-defined password, or secured data 33B that requires a password to access as set forth below.

Figure 2A:
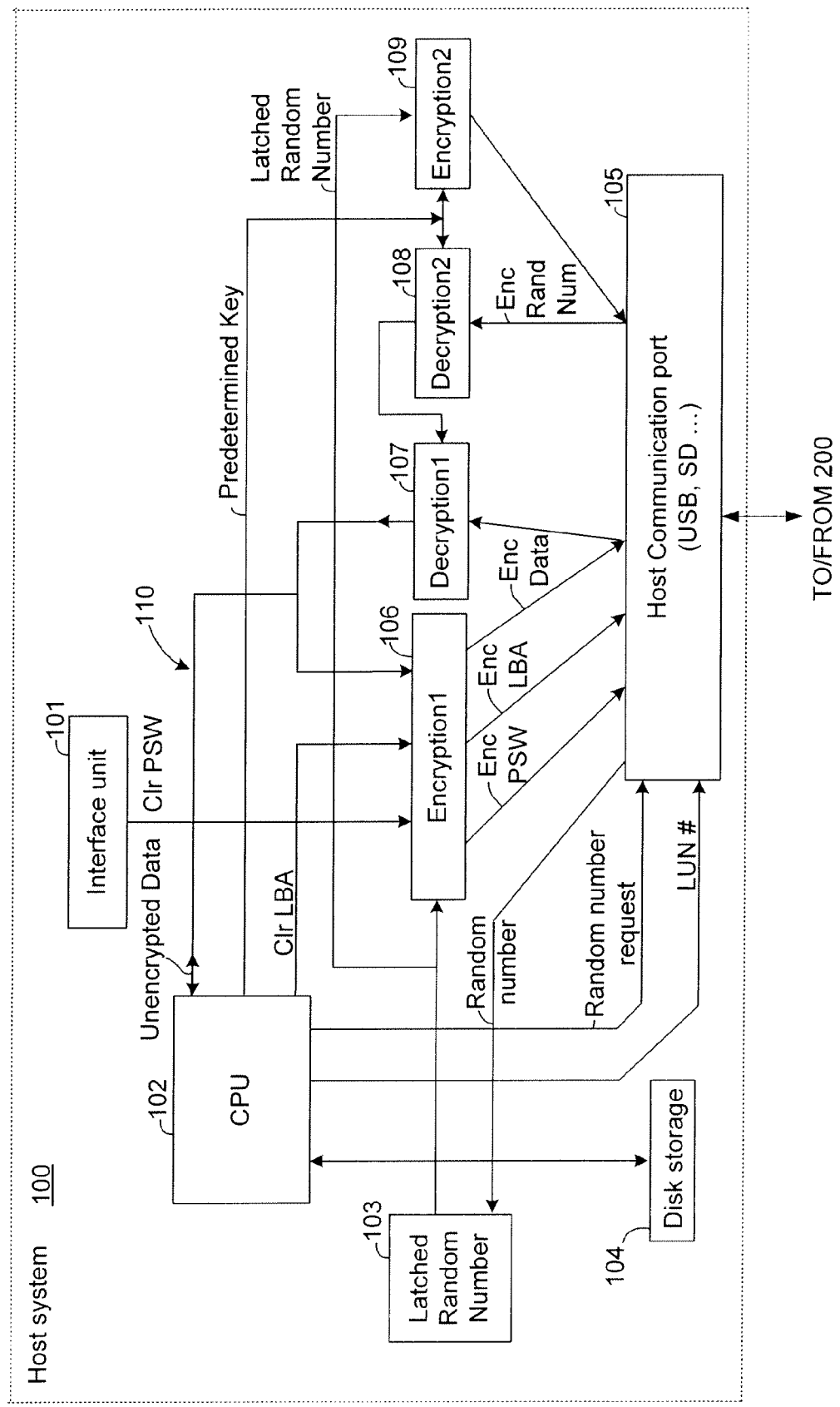

With reference to FIGS. 2(A) and 2(B), a system for providing security to an electronic data flash card includes a host system generally designated 100 and a electronic data flash card generally designated 200 which may be coupled to the host system 100. The host system 100 includes a central processing unit (CPU) 102 coupled to a bus 110 (generally indicated by signal lines in FIG. 2(A). CPU 102 may be operable to control data flow between the host system 100 and the electronic data flash card 200 and to control encryption and decryption engines as further described herein. A computer interface unit 101 is coupled to bus 110 and provides a means for entering an unencrypted user password under CPU control. In one embodiment, computer interface unit 101 includes a keyboard, scanner, or finger print/eye pattern reader. Disk storage 104 is coupled to the bus 110 and provides local storage for the CPU instructions, and stores data to be read/written to the electronic data flash card 200.

A first latch 103 is coupled to the bus 110 and provides a means for temporarily storing a random number generated by a electronic data flash card random number generator 204 under control of a electronic data flash card microprocessor (not shown) as further described herein. A first encryption engine 106 is coupled to the bus 110 and provides encryption of an unencrypted logical block address (LBA), an unencrypted password, and unencrypted data using the latched random number. A second encryption engine 109 is coupled to the bus 110 and provides encryption of the latched random number using a predetermined (device specific) key to generate an encrypted random number. The predetermined key is generated by the CPU 102 using a predetermined algorithm and a predetermined identification value that is assigned to electronic data flash card 200 (e.g., a product identification number or device serial number, or a valid user-defined password). In a simple exemplary embodiment, the predetermined key for a particular electronic data flash card is a predetermined portion of a device serial number that is transmitted from electronic data flash card 200 to host system 100 at power up (e.g., when electronic data flash card 200 is plugged into a USB female socket provided on host system 100). By generating/reproducing the predetermined key for each electronic data flash card 200 in this manner, host system 100 is not required to store the predetermined key associated with every electronic data flash card 200 that may be coupled to host 100, thereby minimizing the use of storage space and avoiding the need to perform an initiation process before using each electronic data flash card 200. In addition, this approach provides host systems located at different locations a consistent way to determine the predetermined keys assigned to a large number of electronic data flash cards 200, thereby allowing each host system to retrieve the encrypted data written by another host system.

A first decryption engine 107 is coupled to the bus 110 and provides decryption of encrypted data received from the electronic data flash card 200 during a read operation using the random number provided by a second decryption engine 108. The second decryption engine 108 is coupled to the bus 110 and provides decryption of the encrypted random number received from the electronic data flash card 200, also during the read operation, using the predetermined key to regenerate the random number provided to the first decryption engine 107.

A host communication port 105 is coupled to the bus 110 and may include an interface such as a USB interface, a serial communication port interface, an Ethernet port interface and a wireless port interface. The host communication port 105 is used to establish a communication link with a communication port (input/output interface circuit) 203 of electronic data flash card 200 over a suitable communication medium (interface bus).

With particular reference to FIG. 2(B), electronic data flash card 200 includes microprocessor (not shown) and additional circuits that are mounted on a card body in the manner described above, and that are interconnected (coupled) by a bus 210 (generally depicted by the various signal lines in FIG. 2(B)). In particular, random number generator 204 is coupled to bus 210, and provides the random number which is temporarily stored in a second latch 205, also coupled to bus 210. Random number generator 204 may be a pseudo-random number generator, or use thermal noise as a source of true randomness. A storage medium 209 is coupled to bus 210, and in one embodiment includes one or more flash memory devices. Storage medium 209 provides storage for the encrypted random number, the encrypted data, a hashed password as further described herein, and an electronic data flash card serial number or other identifying information that is unique to electronic data flash card 200. Writing data to and reading data from storage medium 209 is performed using a Physical Block Address (PBA) that is provided by a PBA translator 206, which is coupled to bus 210. Storage medium 209 may further include public and secure areas.

A decryption engine 208 is coupled to bus 210, and provides decryption of an encrypted password and an encrypted LBA received from host system 100. A first hash engine 212, which is coupled to bus 210, provides a hashed password generated from the decrypted password received from decryption engine 208. The hashed password is stored in the storage medium 209. A second hash engine 214, also coupled to the bus 210, provides, in one embodiment, a hashed serial number that is generated from the device serial number for electronic data flash card 200 that is stored in the reserved sector of storage medium 209. A scramble engine 216, also coupled to the 210, generates an index from the unencrypted LBA and the hashed serial number. PBA translator 206 translates the index into the PBA for the address to access the storage medium 209. A comparator 207, also coupled to the bus 210, compares a hashed password with a previously stored hashed password as further described herein.

Figure 3A:
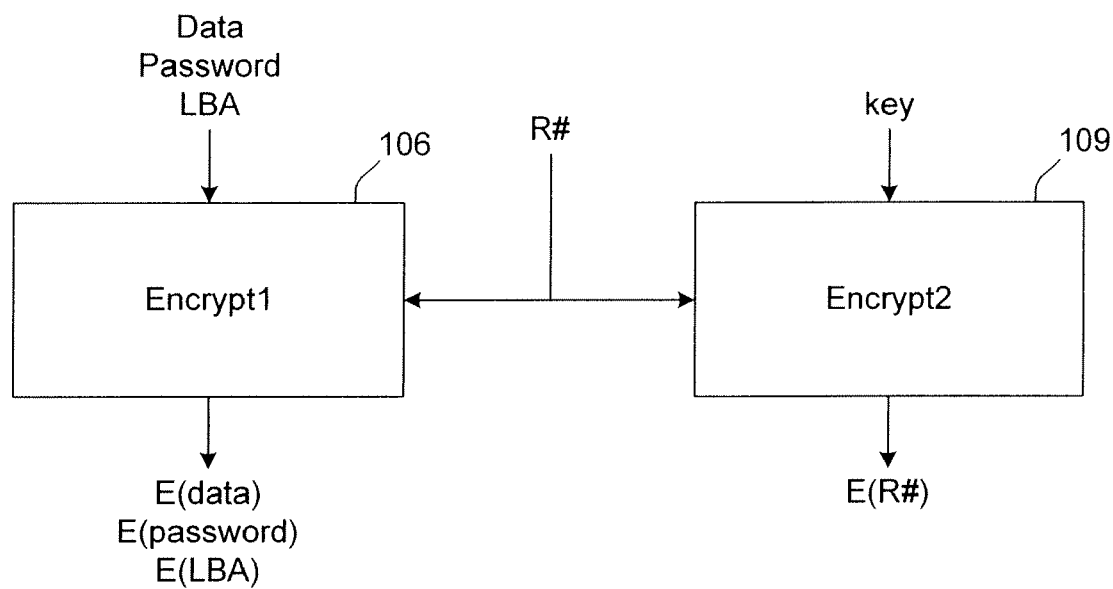
FIGS. 3(A) and 3(B) are simplified block diagrams depicting encryption and decryption performed by the host system of FIG. 2(A) in accordance with another embodiment of the present invention.
Figure 3B:
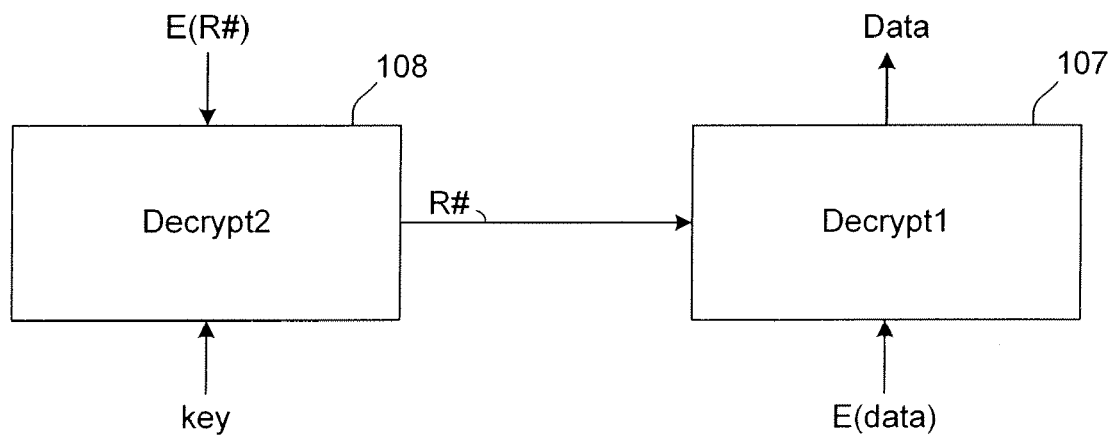

FIGS. 3(A) and 3(B) illustrate the functionality of first and second encryption engines 106 and 109 and first and second decryption engines 107 and 108 of host system 100. With reference to FIG. 3(A), the random number (R#) is used by the first encryption engine 106 to encrypt the LBA, the password and the data, and generates an encrypted LBA E(LBA), an encrypted password E(password) and encrypted data E(data). The second encryption engine 109 encrypts the random number (R#) using the predetermined key to generate the encrypted random number E(R#). With reference to FIG. 3(B), the encrypted random number E(R#) is decrypted using the key by the second decryption engine 108. The decrypted random number E(R#) is then used by the first decryption engine 107 to decrypt the encrypted data E(data).

A hacker may gain unauthorized possession of electronic data flash card 200 and seek to read or otherwise use the information (data) stored therein. In accordance with an embodiment of the present invention, in cases where the hacker also gains unauthorized access to the host system 100 or to a machine having a similar configuration, security for the information is provided by password protection or another user verification mechanism (e.g., fingerprint sensor) that operates under the control of CPU 102.

Figure 4A:
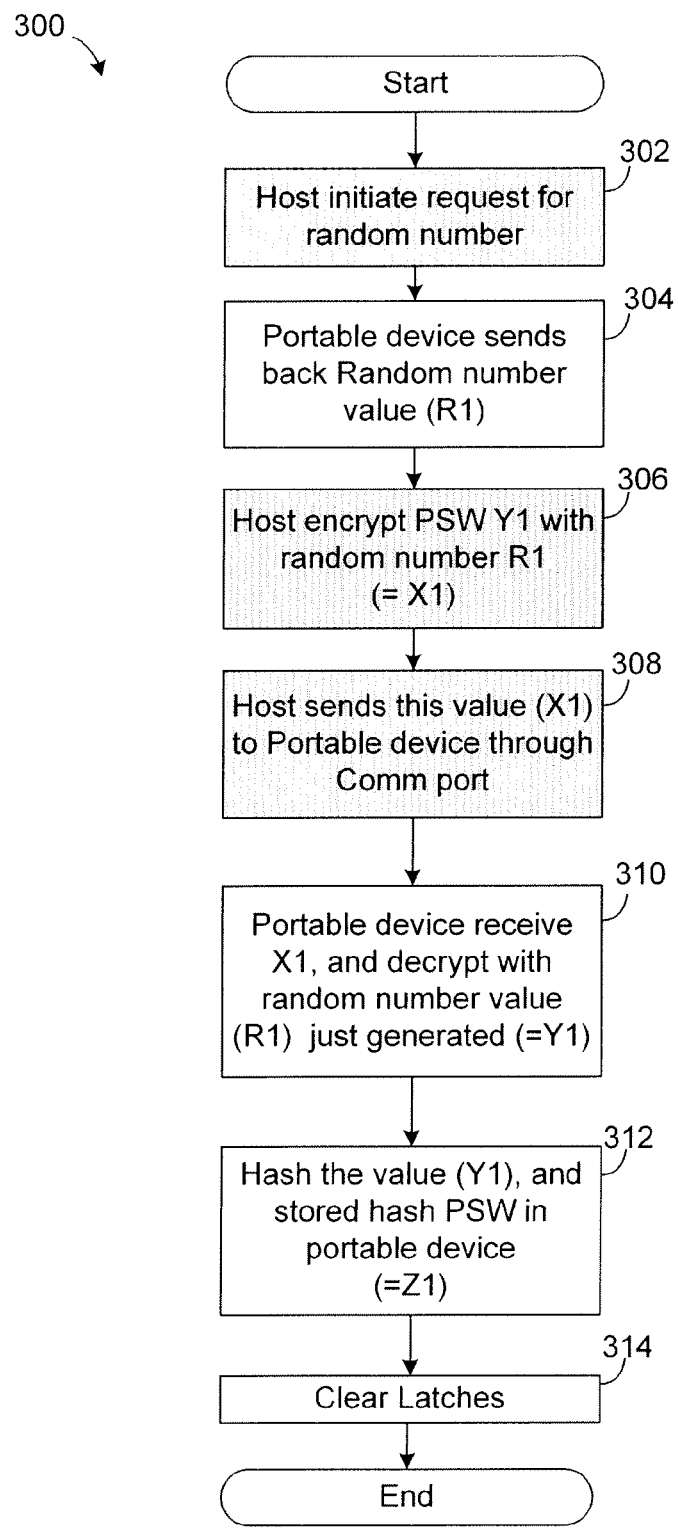
FIGS. 4(A) and 4(B) are flow diagrams depicting methods for entering passwords into the flash memory system of FIGS. 2(A) and 2(B) in accordance with an embodiment of the present invention.

With reference to FIG. 4(A), in accordance with an embodiment of the present invention, a method generally designated 300 for entering an original password includes causing the host system 100 to initiate a request for a random number from electronic data flash card (portable device) 200 (block 302). Electronic data flash card 200 then causes random number generator 204 to generate a random number R1, and transmits the random number to host system 100, where the random number is temporarily stored in first latch 103 (block 304). In one embodiment, the random number R1 is also be temporarily stored by electronic data flash card 200 in second latch 205. Host system 100 then utilizes first encryption engine 106 and random number R1 to encrypt an original password Y1 that is entered by an authorized user through interface unit 101, thereby generating an associated encrypted password X1 (block 306). Host system 100 then transmits encrypted password X1 to electronic data flash card 200 (block 308), and electronic data flash card 200 decrypts encrypted password X1 using the random number stored in second latch 205 and decryption engine 208 to reproduce the original password Y1 (block 310). Decrypted password Y1 is then hashed using first hash engine 212 to produce a hashed password Z1, and hashed password Z1 is stored in the secure area of the storage medium 209 (block 312). The contents of the first latch 103 and of the second latch 205 are then cleared (block 314).

Figure 4B:
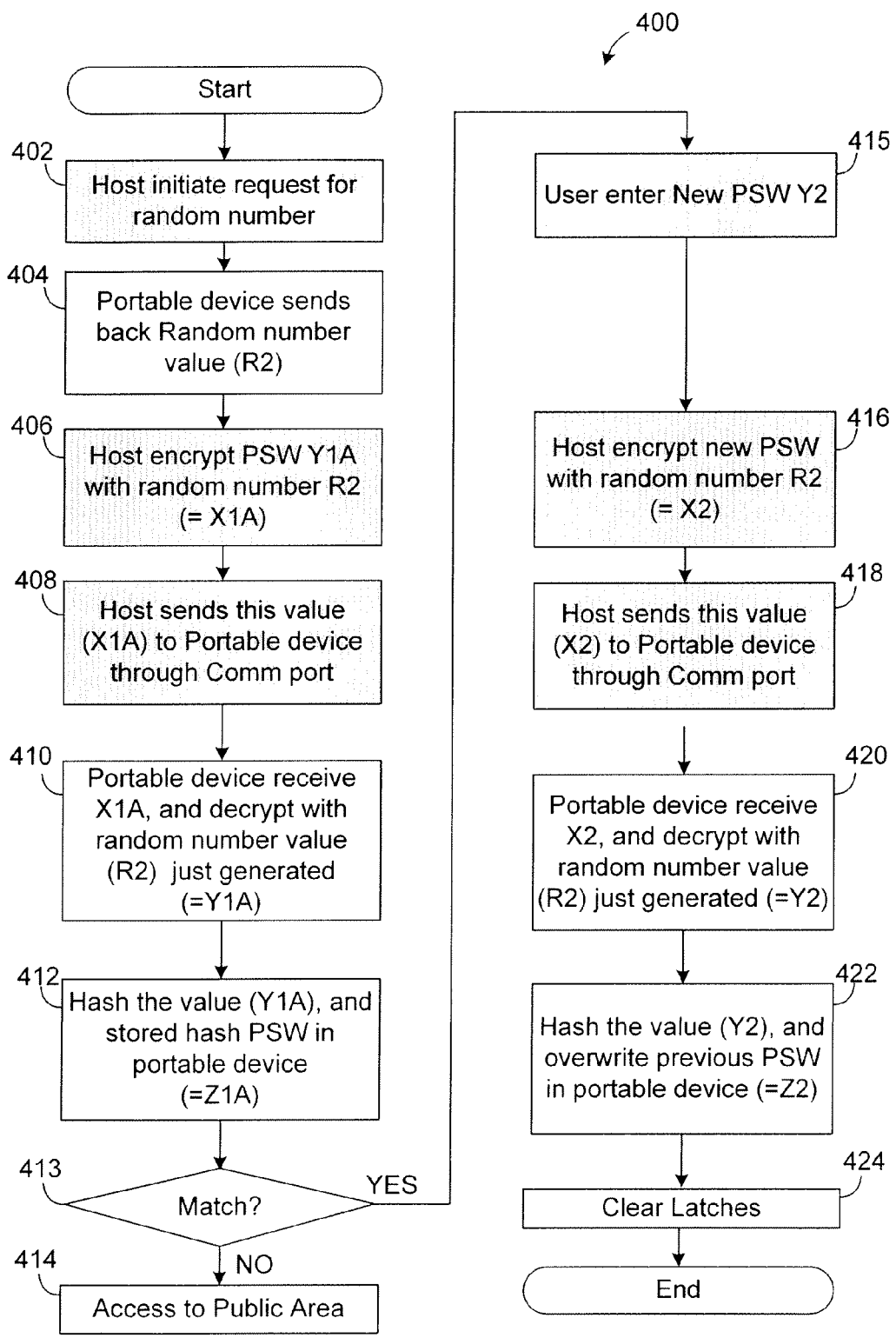

In accordance with another aspect of the invention, the user selectively enters a new password to replace the initial password Y1, for example, when initial password Y1 is deemed "stale". With reference to FIG. 4(B), a method generally designated 400 for entering a new password includes causing the host system 100 to initiate a request for a random number from electronic data flash card 200 (block 402). In response to this request, electronic data flash card 200 causes random number generator 204 to generate a new random number R2 that is sent to the host system 100 and temporarily stored in first latch 103 (block 404). New random number R2 is also stored temporarily in the second latch 205 of the electronic data flash card 200. New random number R2 is then used in conjunction with first encryption engine 106 to encrypt a password Y1A that is entered by the user through the interface unit 101 to produce a new encrypted password X1A (block 406). Host system 100 then sends the encrypted password X1A to electronic data flash card 200 (block 408), which then decrypts the sent encrypted password X1A using the new random number R2 and decryption engine 208 to reproduce password Y1A that was entered by the user into host system 100 (block 410). The decrypted password Y1A is then hashed using first hash engine 212 to generate a second hashed password Z1A (block 412). In block 413, the second hashed password Z1A is then compared using comparator 207 to the first hashed password Z1 that was previously stored in the storage medium 209 (see block 312, FIG. 4(A)). If second hashed password Z1A does not match the previously stored hashed password Z1 (NO branch from block 413), the user will only have access to the public area of the electronic data flash card 200 (block 414). In alternative embodiments of the invention, the user may be given a plurality of opportunities to enter the original password to enable the user to correct any mistakes in the entry of the original password. Preferably the user is given three opportunities to enter the original password.

If the first and second hashed passwords match (YES branch from block 413), then the user is prompted to selectively enter a new password Y2 through interface unit 101 (block 415). Using the new random number R2, the host system 100 encrypts the new password Y2 in first encryption engine 106 to produce encrypted password X2 (block 416). Host system 100 then sends the new encrypted password X2 to electronic data flash card 200. Electronic data flash card 200 then decrypts the received new encrypted password X2 using decryption engine 208 and new random number R2 to reproduce decrypted password Y2 (block 420). The decrypted new password Y2 is then hashed using first hash engine 212 to generate a new hashed password Z2, and the previous hashed password Z1 is overwritten with new hashed password Z2 (block 422) such that new hashed password Z2 is stored in the secure area of storage medium 209. The contents of the first latch 103 and of the second latch 205 are then cleared (block 424).

Figure 5:
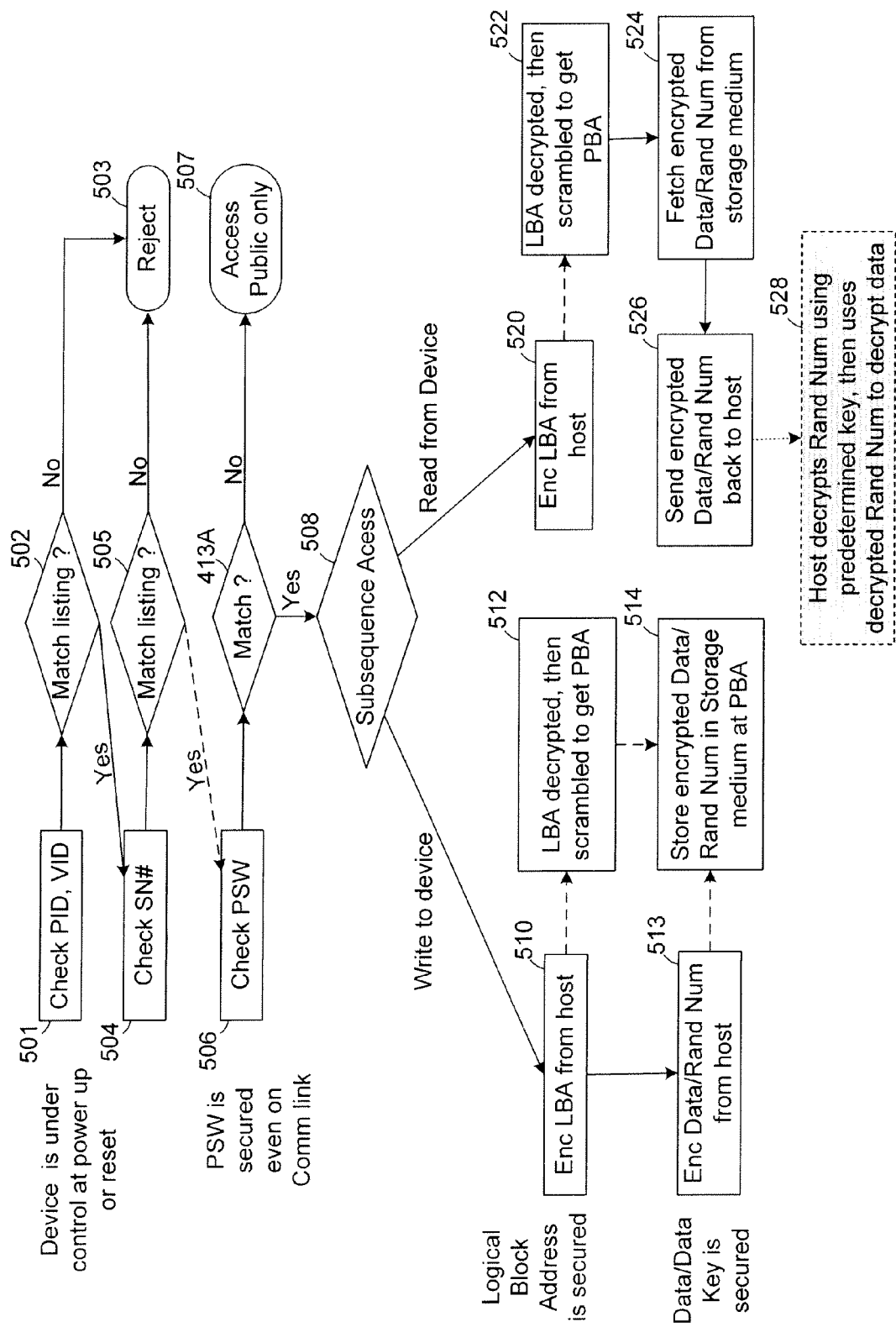
FIG. 5 is a flow diagram of a method for providing security to the electronic data flash card of FIG. 2(B) in accordance with the present invention.

In accordance with another embodiment of the present invention, before verifying the user's password, as provided for in method 400, additional security is provided wherein host system 100 checks the electronic data flash card's product identification, vendor identification and serial number against values stored in host system 100. As shown in FIG. 5, a method for providing security to the electronic data flash card 200 generally designated 500 includes causing the host system 100 to request a product identification number and a vendor identification number from electronic data flash card 200 at power up or reset, and to compare the provided product and vendor identification numbers with stored values (block 501). If the provided product identification number and vendor identification number don't match values stored in the host system 100 (No branch from block 502), then access to the electronic data flash card is rejected (block 503). If the values do match (Yes branch from block 502), then the electronic data flash card's serial number is requested by the host system 100, and the provided serial number is compared with a stored value (block 504). If the provided serial number doesn't match the value stored in the host system 100 (No branch from block 505), then access to the electronic data flash card is rejected (block 503). If the values do match (Yes branch from block 505), then the host system 100 checks a password entered by the user of the electronic data flash card 200 against the password stored in the electronic data flash card 200 (block 506), for example, by performing the process of blocks 402 through 413 of the method 400 (see FIG. 4(B)). If the entered password does not match the stored password (No branch from block 413A), then the user is only granted access to the public area of the electronic data flash card 200 (block 507). In one embodiment, the user is provided one or more additional opportunities to enter the correct password. If the password entered does match the original password (Yes branch from block 413A), then host system 100 determines whether write or read access to the public and/or secure storage areas of electronic data flash card 200 is requested (block 508).

If write (program) access to electronic data flash card 200 is requested, host system 100 uses the random number generated during the password check to encrypt the LBA, data and password, and the predetermined key and random number to encrypt the random number in the manner depicted in FIG. 3(A) and described above. Referring to the bottom of FIG. 5, host system 100 then sends the encrypted LBA, encrypted data and encrypted random number to the electronic data flash card 200 (blocks 510 and 513). The encrypted LBA is decrypted by electronic data flash card 200 using decryption engine 208 and the random number, and then scrambled using scramble engine 216 to generate an index that is translated by the PBA translator 206 to generate the PBA of the desired secure flash memory block (i.e., in the secure area of storage medium 209) into which the encrypted data is to be written (block 512). The encrypted data and the associated encrypted random number are then stored in the desired secure flash memory block of the storage medium 209, which is identified by the generated PBA (block 514).

If read (data retrieval) access to the electronic data flash card 200 is requested, the random number generated in the password check is used by host system 100 to encrypt the LBA of the desired data stored on electronic data flash card 200. The host system 100 then sends the encrypted LBA to electronic data flash card 200 (block 520). The encrypted LBA is then decrypted by electronic data flash card 200 using decryption engine 208 and the random number, and then the decrypted LBA is scrambled using scramble engine 216 to generate the corresponding index that is translated by the PBA translator 206 to generate the PBA of the desired data (block 522). The encrypted data and its associated encrypted random number are then fetched (read) from the secured area of storage medium 209 corresponding to the generated PBA (block 524). The encrypted data and the encrypted random number are then sent to the host system 100 (block 526). The host system 100 then decrypts the encrypted random number in decryption engine 108 using the predetermined key to recreate the random number associated with the desired data, and then decrypts the encrypted data using the decrypted random number and decryption engine 107 (block 528).

In accordance with the invention set forth above, all information transmitted between host system 100 and electronic data flash card 200 is encrypted, thereby preventing a hacker from monitoring communication bus traffic or using a bus monitor to gain access to the data. That is, as set forth above, only encrypted LBA values, encrypted password values and encrypted data are transmitted between communication port 105 of host system 100 and communication port 203 of electronic data flash card 200. Thus, a hacker monitoring these transmissions only receives encrypted data. By utilizing a secure encryption system to encrypt these values, the hacker will be unable to comprehend the content of the data.

Figure 6:
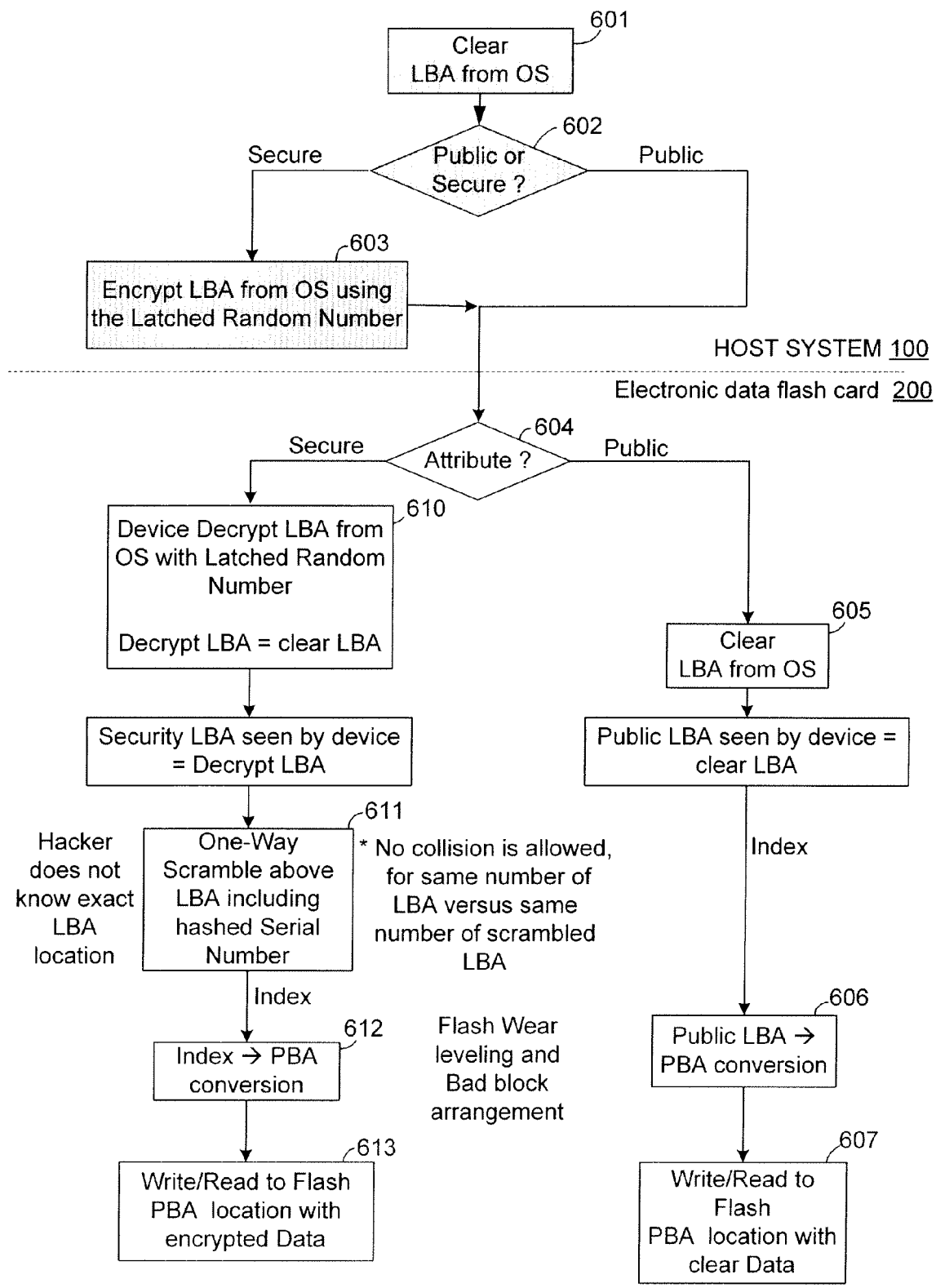
FIG. 6 is a flow diagram of a method for transforming an address in a public area and a secure area of the electronic data flash card in accordance with the present invention.

In accordance with another aspect of the invention, a method for determining an address transform generally designated 600 is shown in FIG. 6. In response to either a write access request or a read access request to the electronic data flash card 200, a corresponding LBA is generated by host system 100 (block 601), and host system 100 determines which of the public or secure storage areas the requesting user is authorized to access (block 602). If the user enters a valid password as described with respect to step 506 of the method 500 and the user tries to access (i.e., either write confidential data to or read confidential data from) the secure area of electronic data flash card 200, then the corresponding LBA is encrypted using the random number generated by the random number generator 204 by the first encryption machine 106 in the manner described above (block 603). Host system 100 then transmits the encrypted/non-encrypted LBA, along with encrypted data and random number in the case of a write operation, to electronic data flash card 200.

Figure 6A:
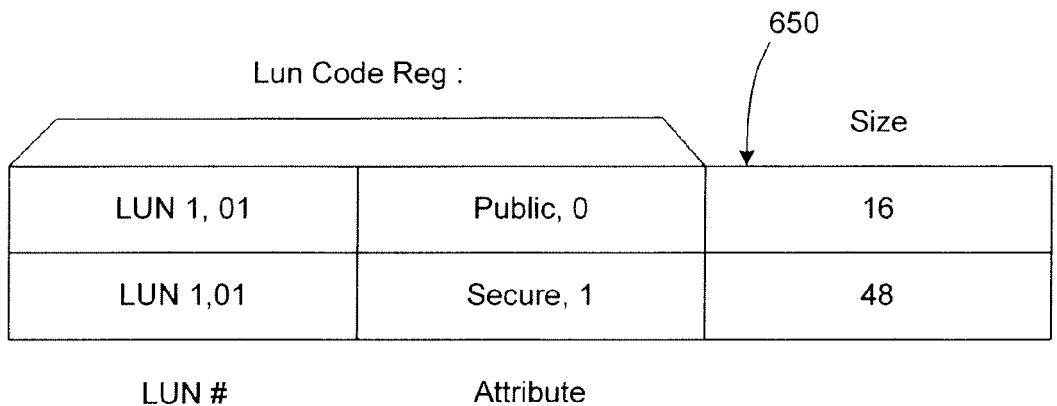
FIG. 6A is a schematic representation of a LUN Code Register utilized by the electronic data flash card during the method of FIG. 6.

Upon receiving the encoded LBA, electronic data flash card 200 determines a public/secure attribute value associated with the LBA (block 604). In one embodiment, the public/secure attribute is determined using a LUN Code Register 650, which is shown in exemplary form in FIG. 6A. A drive letter (LUN), which identifies the flash device partition accessed during the read/write operation (i.e., the location of the associated LBA), is transmitted with the LBA according to known techniques. In this embodiment, the flash memory is partitioned into at least two drives including at least one public sector drive (e.g., drive "C:") and one secure sector drive (e.g., drive "D:"). There are no limitation to the number of partitions the data flash card, provided there are into only one public and one secure domain. The LUN value for a transmitted LBA is compared or otherwise analyzed by LUN Code Register 650, which identifies the target drive, and thereby determines whether the LBA is associated with public or secure data.

If the attribute value of the transmitted LBA belongs to the public domain, then the access associated with the transmitted LBA is to the public area of the electronic data flash card 200, and the transmitted LBA is treated as an unencrypted ("clear") LBA by electronic data flash card 200 (block 605). The transmitted LBA is converted to a corresponding PBA by a public LBA-to-PBA conversion table, which is generated in volatile memory at power up of electronic data flash card 200 (block 606). Finally, write and read access of public data is provided to the storage medium 209 using the PBA (block 607).

If the attribute value determined in block 604 is one, then the access associated with the transmitted LBA is to the secure area of the electronic data flash card 200, and the encrypted LBA generated in block 603 is decrypted using decryption engine 208 (block 610). The decrypted LBA is then scrambled with the hashed serial number in scramble machine 216 (block 611). The scrambled LBA is then used as an index to the PBA translator 206 (block 612). Finally, write and read access of encrypted data is provided to the storage medium 209 using the PBA (block 613).

Figure 7:
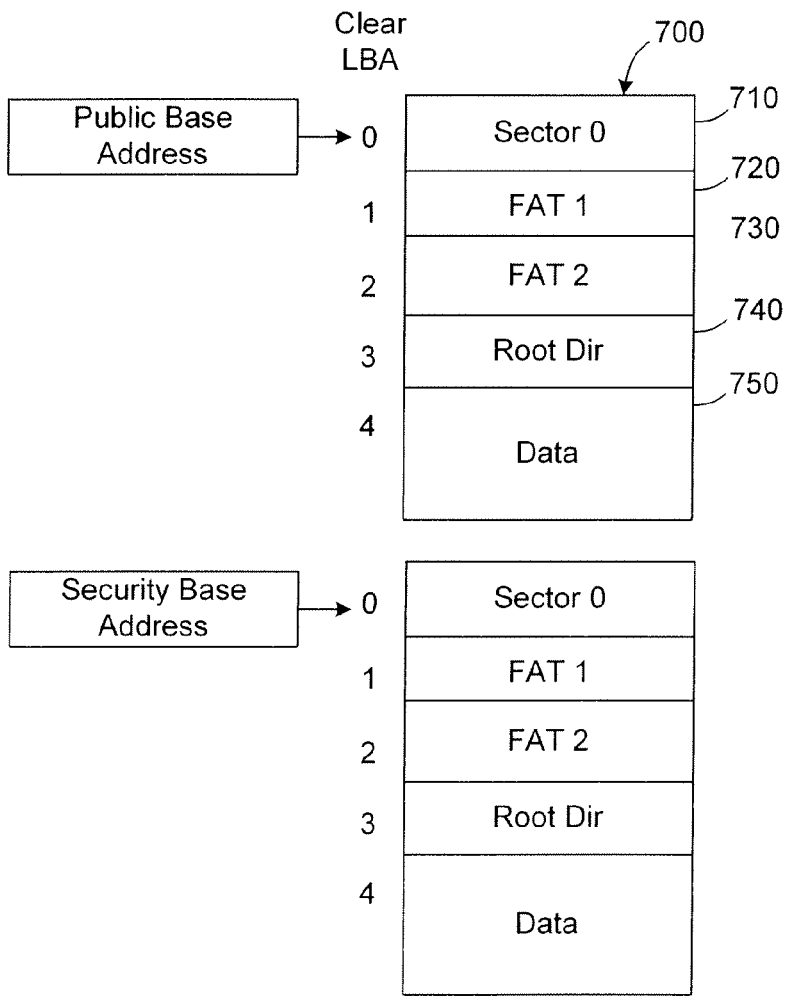
FIG. 7 is a schematic representation of a prior art FAT structure.

FIG. 7 shows a prior art FAT structure 700 for both public and secure areas of a conventional electronic data flash card. Each FAT file system may include a Master Boot Block (MBB) 710 located at a sector 0, followed by FAT1 and FAT2 tables 720 and 730 respectively, a Root Directory 740, and Data 750. The FAT file system 700 may be a FAT16/32 or NTFS system.

FIG. 8 is a schematic representation showing an address transform system 800 for accessing the public and secure areas of electronic data flash card 200 according to an embodiment of the present invention (i.e., when LBA is received from host system 100 without encryption). At power up, a public LBA-to-PBA translation table 810 is generated according to block information data in a spare area 815. The spare area 815 may contain information including LUN #, Valid, Stale and Public with the LBA or Secure with the scrambled LBA. The LBA is used as an index 820 to the public LBA-to-PBA translation table 810 to generate the PBA.

For access to the secure area of the electronic data flash card 200, a corresponding encrypted LBA is provided by host system 100. At power up, a secure index-to-PBA translation table 830 is generated according to the block information data in spare area 815. The encrypted LBA is decrypted using the methods described above. In one embodiment, a security scramble index 835 is calculated using the LBA 840 and the hashed serial number 845. The security scramble index 835 is then used to identify the corresponding PBA for the storage medium 209 from security-to-PBA translation table 830.

Figure 9A:
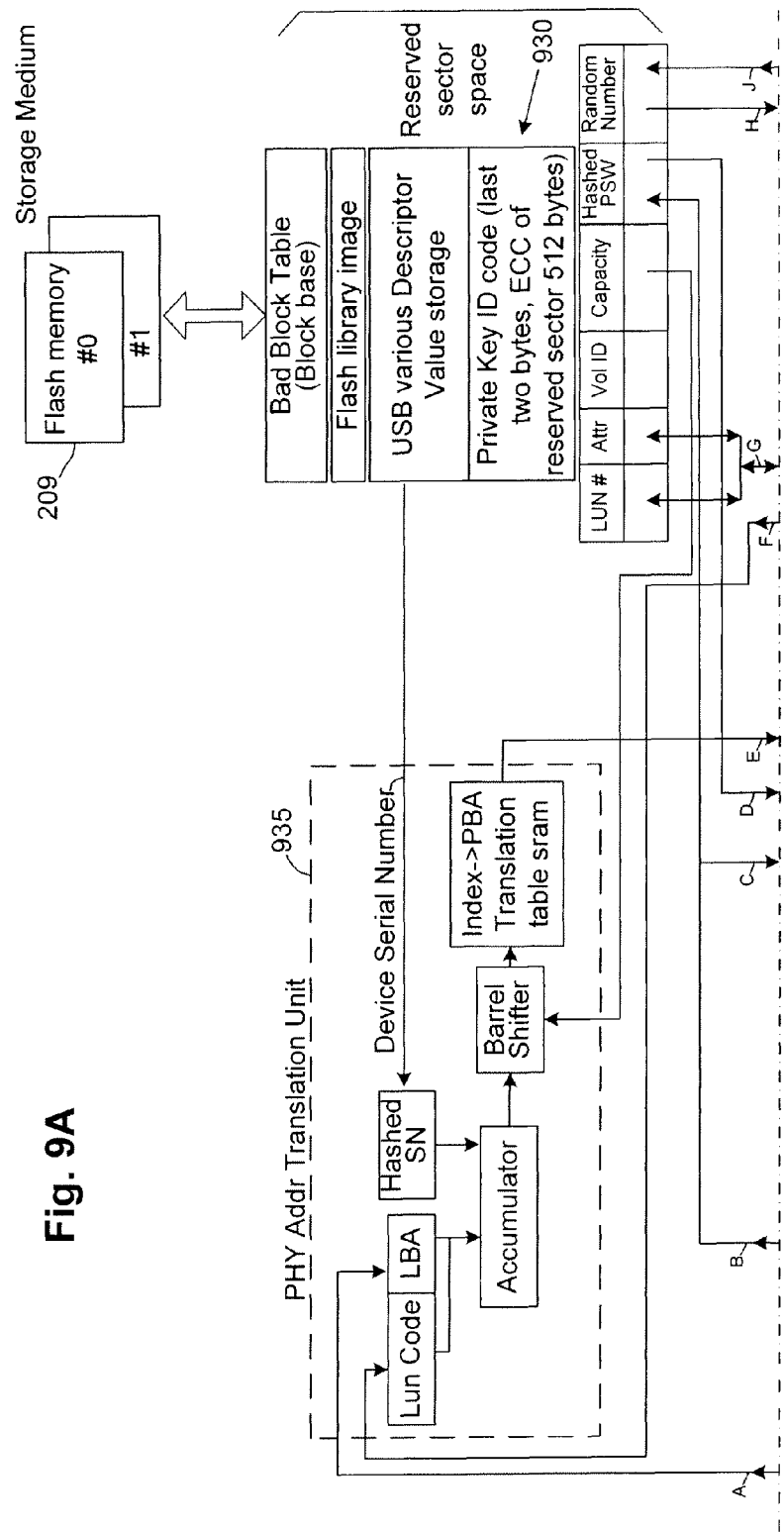
FIGS. 9A and 9B, is a schematic representation of a USB device in accordance with the present invention.
Figure 9B:
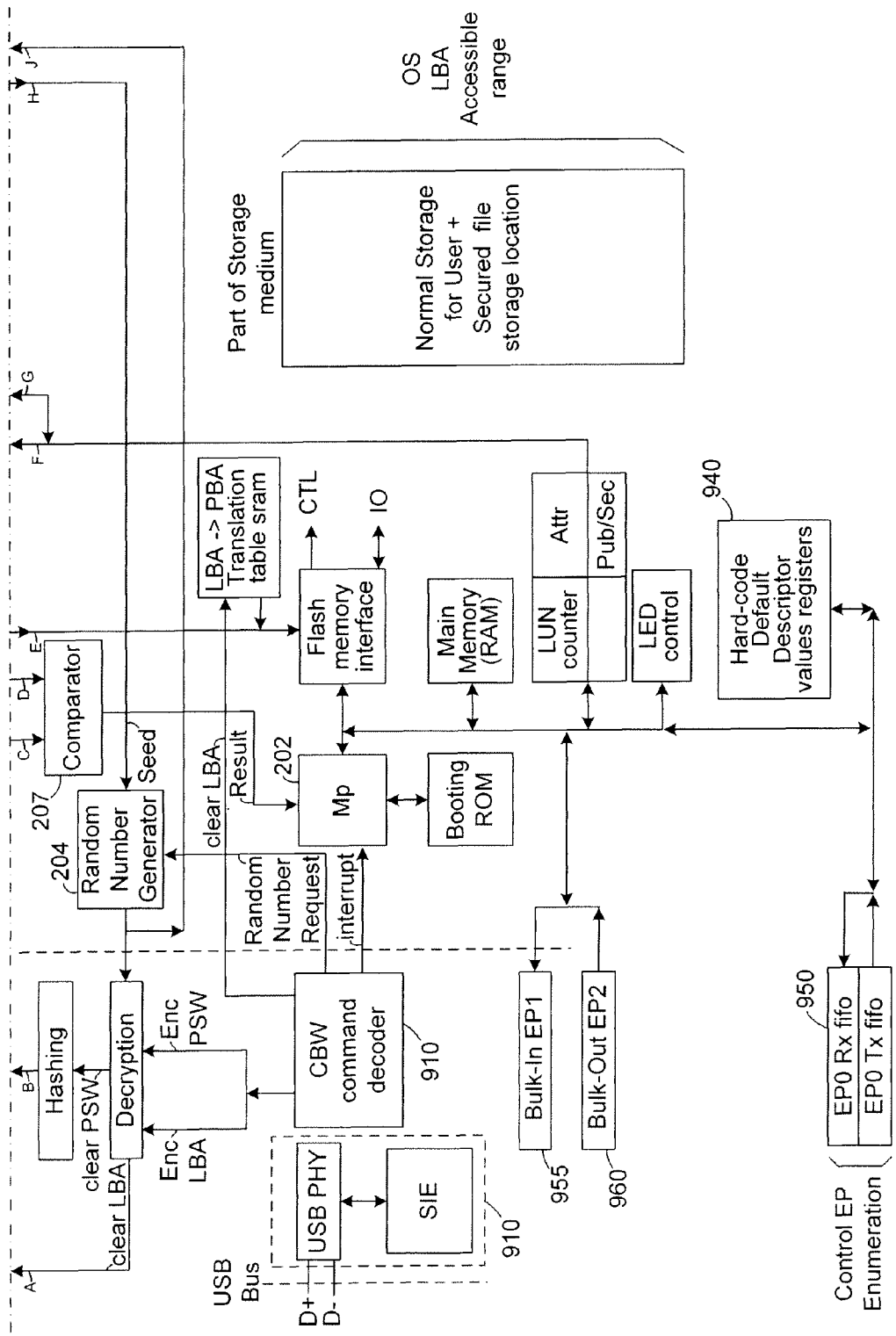

In accordance with one aspect of the invention, the system and method of the invention are implemented in a USB device as shown in FIG. 9. LUN counter 650 is capable of providing Public and Secure partitioning of flash storage medium 209 of the USB device. Each partition can hold a different type of removable or fixed storage function, volume capacity and ID associated therewith.

A reserved sector of 512 bytes with pre-programmed control information and other non-volatile registers which holds capacity and partition information is stored in a first available address space 930. This information is one time programmed by host drivers, and they are not changed frequently as disk data requires. Two copies of this information is preserved due to the erase-before-write nature of flash memory. First available flash memory block is reserved for this purpose. A "reserved space ratio" entry, entered by manufacture operator is used to determine the size of reserved space.

Address translation tables are implemented by volatile memory (SRAM) to keep track of where a valid copy of data is stored in storage medium 209. One table includes the LBA-to-PBA translation table 810, which is provided for generating the public area's PBA, and the other table includes the index-to-PBA translation table 830, which is provided for generating the secure area's PBA. Logical block address (LBA) sent by a Command Block Wrapper from host system 100 for public area access is used as an index to the LBA-to-PBA translation table 810 for storage medium 209.

The PBA address generation process is more complicated for the secure area. The encrypted LBA from the host system 100 is decrypted to generate the LBA with a current available random number key. The LBA is then scrambled with the hashed serial number to generate an index for use in Index-to-PEA translation table 830. The resulting PBA is then used to access the storage medium 209.

Architecture of this innovation is based on Bulk-only-transport of Mass Storage Device, a Command Block Wrapper (CBW) with 31 bytes of control information sent by host system 100. A CBW command decoder 910 decodes the CBW command and interrupt the electronic data flash card controller 202.

Random number generator 204, at power up or reset, receives the previously stored random number from a reserved sector 930 as a current seed random number. Upon receiving a random number request initiated by host system 100, random number generator 204 generates a new random number based on the current random number.

Decryption engine 208 of electronic data flash card 200 uses the random number from the random number generator 204 as a key. If the access sought is to the secure area, the encrypted LBA is restored (decrypted) to provide LBA 840 (FIG. 8), and the decrypted LBA is sent into a physical address translation unit 935. The encrypted password is also restored (decrypted) to provide the entered password, and the decrypted password is sent to first hash engine 212. Once the entered password has been hashed, it is compared with the hashed password stored in the reserved sector 930. The result is then sent to controller 920 for authentication.

Physical address translation unit 935 represents one exemplary embodiment of how the scrambled index may be generated.

In one embodiment, hard-coded registers 940 are used to respond to host system 100 with default enumeration descriptors when the storage medium 209 is empty. If storage medium 209 is programmed already, the value stored will be sent back instead of a default value from the hard-coded registers 940.

Endpoint 0 950 is dedicated for enumeration purposes, with packet size being programmed in a device descriptor field for information transfer, and in one embodiment are a 64 byte packet.

Endpoint 1 955 is a Bulk-in pipe for host system 100 to read in information, and endpoint 2 960 is a bulk-out pipe for host system 100 to send data to electronic data flash card 200. In one embodiment, these two pipes are 64 bytes in accordance with USB Version 1.1 specifications, and 512 bytes in accordance with the recent USB version 2.0 specification.

Figure 10:
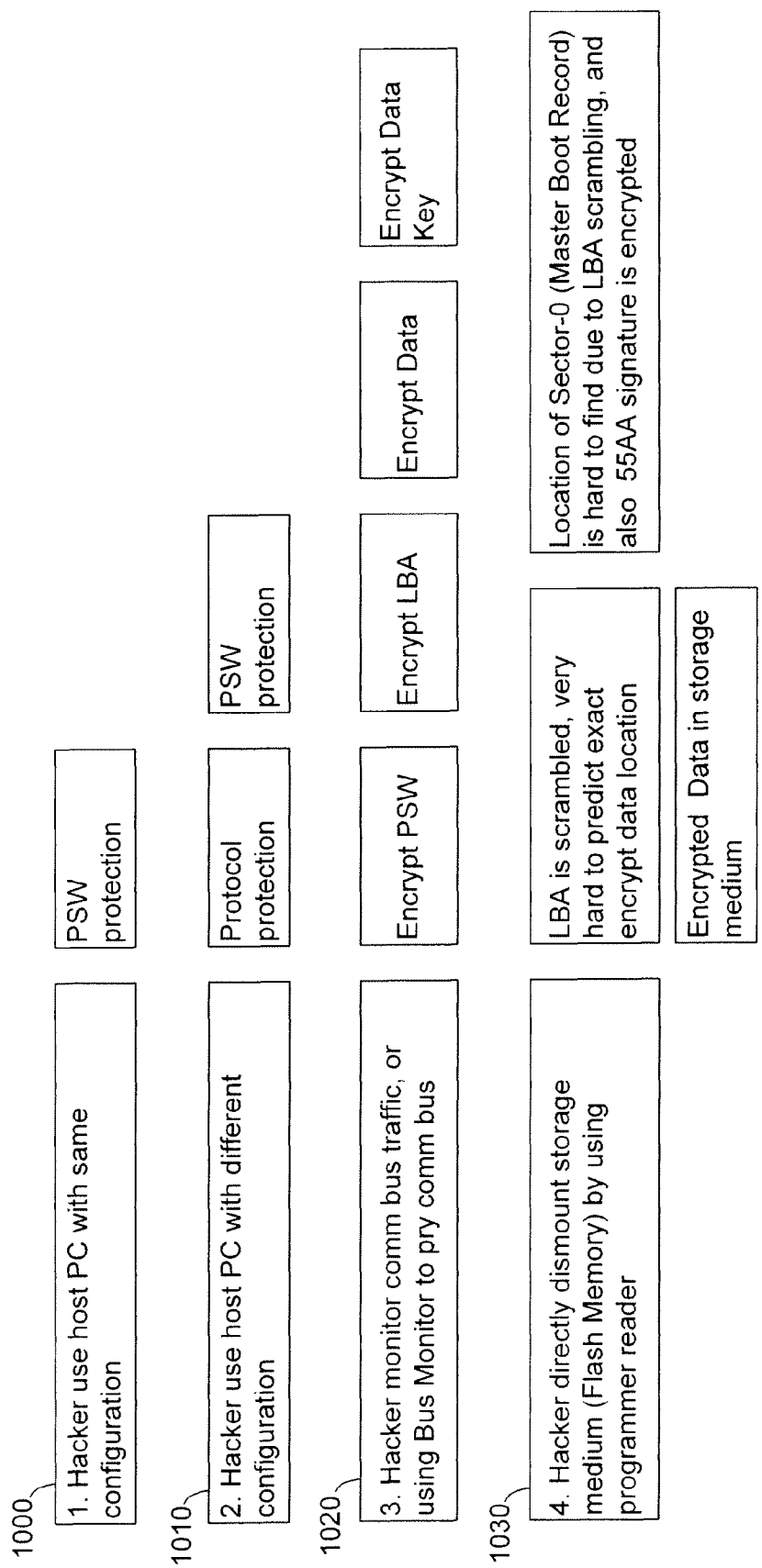
FIG. 10 is a chart summarizing various features of the present invention.

FIG. 10 shows a chart summarizing various features of the present invention. Various scenarios in which a hacker gains access to the electronic data flash card 200 are shown. In a first scenario 1000, the hacker may gain access to host system 100 but will not have access to the data stored in electronic data flash card 200 due to password protection. In a second scenario 1010, the hacker may use a host system having a different configuration from the host system 100. The hacker will not be able to gain access to the data stored in the electronic data flash card 200 due to password protection and protocol protection.

In a third scenario 1020, the hacker may monitor bus traffic such as by using a bus monitor. The hacker will not be able to gain access to the data stored in electronic data flash card 200 due to encryption of the password, encryption of the LBA, encryption of the data and encryption of the random number that are transmitted between host system 100 and electronic data flash card 200. In a fourth scenario 1030, the hacker may read the storage medium 209 using a reader. The hacker will not be able to gain access to the data stored in electronic data flash card 200 due to the scrambled LBA, encryption of the data, and the location of Sector 0 is hard to find due to LBA scrambling and 55AA signature encryption.

In accordance with an embodiment of the present invention, a USB drive with Password Security is achieved by partitioning the USB drive into public and security zones. There are two options to generate this partitioning. One is the public zone is always accessible by host, while the security zone is secured through password. The other is that the public and security zones share the same drive letter, and only one can be accessed a time. The public zone is accessible by default, while the security zone will be accessible by entering a valid password.

A software application program is needed to add the password security to a USB drive. When the program is activated, it will first detect if a USB drive is plugged into the host computer. The program allows the USB drive to be partitioned into public and security zones, and it will prompt a user to define (enter) the password for accessing the security zone before the partitioning task begins. The program also allows the password to be changed to a different one at a later time.

In one option, after partitioning, the program allows user to switch between the public and security zones. The correct password must be entered to login to the security zone to read, write or copy files, otherwise no access is allowed. Once logout is performed, the program switches back to the public zone.

For tracking purpose, the processor of the host computer may have embedded processor ID (Identification) that includes processor information and a unique serial number.

With the processor ID, a processor ID control security can be implemented into the electronic data flash card such that only the host computers with processor ID registered in the processor ID list in the electronic data flash card are allowed to access the electronic data flash card.

When the electronic data flash card is plugged into a host computer, the processor ID or IDs (for computer with multi-processor) will be verified against the processor ID list, the access will only be granted if the verification is a success. Therefore with this security the user can protect the electronic data flash card to be misused in host computer that is not registered.

This processor ID control security can be a standalone feature to electronic data flash card or can be added as an additional security layer to the existing encrypted password security.

Although the present invention has been described with respect to certain specific embodiments, it will be clear to those skilled in the art that the inventive features of the present invention are applicable to other embodiments as well, all of which are intended to fall within the scope of the present invention. For example, while the systems and methods described herein are specifically directed to USB devices, the spirit and scope of the present invention is intended to cover different interface bus types, which may include one or more of PCI Express, Secure Digital (SD), Memory Stick (MS), Compact Flash (CF), IDE and SATA. As a further example, the present invention can be implemented using hardware, software, a computer readable medium containing program instructions, or a combination thereof. Software written according to the present invention is to be either stored in some form of computer-readable medium such as memory or CD ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

The invention claimed is:

1. An electronic data flash card adapted to communicate with a host system through a communication link established by the host system over an interface bus, said electronic data flash card comprising:
   (A) a card body;
   (B) a flash memory device mounted on the card body and including a plurality of flash memory cells, each of the plurality of flash memory cells having a physical address;
   (C) an input/output interface circuit mounted on card body and including means for establishing said communication link between the host system and the electronic data flash card when the electronic data flash card is operably connected to the host system;
   (D) a flash memory controller mounted on the card body and electrically connected to said flash memory device and said input/output interface circuit, wherein the flash memory controller comprises:
      means for generating a first random number when the electronic data flash card is accessed by the host system;
      means for verifying a user's authenticity;
      upon verifying said user's authenticity, means for generating a decrypted logical address by decrypting an encrypted logical address received from the host system using the first random number;
      means for determining a physical address using said decrypted logical address; and
      means for accessing selected memory cells of the flash memory device using said physical address.

2. The electronic data flash card according to claim 1, wherein said means for generating said first random number comprises a random number generator including means for generating a random number each time the communication link established by the host system.

3. The electronic data flash card according to claim 2, wherein the random number generator comprises one of means for generating a random number from using a thermal noise value, and a pseudo-random number generator.

4. The electronic data flash card according to claim 1, wherein said means for verifying said user's authenticity comprises a fingerprint sensor.

5. The electronic data flash card according to claim 1, wherein said means for verifying said user's authenticity comprises means for generating a decrypted password by decrypting an encrypted password received from the host system using the first random number, and means for comparing the decrypted password with a stored password.

6. The electronic data flash card according to claim 5, wherein said means for verifying said user's authenticity further comprises means for hashing said decrypted password before comparing the decrypted password with the stored password.

7. The electronic data flash card according to claim 1, wherein said means for generating the decrypted logical address further comprises means for generating an index value by scrambling the decrypted logical address, and utilizing said index value to determine said physical address.

8. The electronic data flash card according to claim 7,
wherein said means scrambling comprises means for reading a predetermined value from said flash memory device and means for hashing said predetermined value, and
wherein said means for scrambling utilizes the hashed predetermined value to produce said index value.

9. The electronic data flash card according to claim 1, wherein said means for accessing selected memory cells using said physical address comprises means for writing encoded data and an associated encoded random number into said selected memory cells.

10. The electronic data flash card according to claim 1, wherein said means for accessing selected memory cells using said physical address comprises means for reading encoded data and an associated encoded random number from said selected memory cells, and means for sending the encoded data and the associated encoded random number to the host system.

11. The electronic data flash card of claim 1, wherein the flash memory controller comprises one of a 8032 processor, a 80286 processor, a RISC processor, an ARM processor, a MIPS processor and a digital signal processor.

12. The electronic data flash card of claim 1, wherein the input/output interface circuit comprises a Universal Serial Bus (USB) interface circuit.

13. A method for providing security to an electronic data flash card coupleable to a host system, the electronic data flash card including a flash memory device, the method comprising:
receiving an encrypted password from the host system;
decrypting the encrypted password in the electronic data flash card using the random number;
hashing the decrypted password in the electronic data flash card;
generating a random number and transmitting the random number to the host system upon initializing the electronic data flash card;
comparing the hashed password to a hashed password stored in the electronic data flash card; and
allowing access to a secure storage area of the flash memory device in the case where the hashed password is the same as the stored hashed password.

14. The method of claim 13, further comprising receiving an encrypted logical address from the host system, and accessing a portion of the secure storage area corresponding to the encrypted logical address.

15. The method of claim 14, further comprising decrypting the encrypted logical address, scrambling the decrypted logical address to generate a physical address of said flash memory device, and storing encrypted data and an encrypted random number in said portion of the secure storage area identified by said physical address.

16. The method of claim 14, further comprising decrypting the encrypted logical address, scrambling the decrypted logical address to generate a physical address of said flash memory device, and reading encrypted data and an encrypted random number from said portion of the secure storage area identified by said physical address.

17. The method of claim 13, further comprising erasing the random number after said allowing access.

18. A method for providing security to an electronic data flash card coupleable to a host system comprising:
receiving a random number generated by the electronic data flash card;
determining a logical address associated with predetermined data;
receiving a password from a user;
encrypting the password and the logical address using the random number;
transmitting the encrypted password and the encrypted logical address to the electronic data flash card.

19. The method of claim 18, further comprising:
encrypting said predetermined data using the random number to generate encrypted data, and encrypting the random number using a predetermined key to generate an encrypted random number; and
transmitting the encrypted data and the encrypted random number to the electronic data flash card.

20. The method of claim 18, further comprising:
decrypting, using a predetermined key, an encrypted random number received from the electronic data flash card in response to said encrypted logical address; and
decrypting, using the decrypted random number, encrypted data received from the electronic data flash card in response to said encrypted logical address.

* * * * *